(12) United States Patent
Yu

(10) Patent No.: US 10,129,724 B2
(45) Date of Patent: Nov. 13, 2018

(54) DATA SENDING METHOD, COMMON SERVICE ENTITY, AND UNDERLYING NETWORK ENTITY

(71) Applicant: Huawei Technologies Co., Ltd., Shenzhen (CN)

(72) Inventor: Qi Yu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 201 days.

(21) Appl. No.: 15/205,652

(22) Filed: Jul. 8, 2016

(65) Prior Publication Data

US 2016/0323695 A1 Nov. 3, 2016

Related U.S. Application Data

(63) Continuation of application No. PCT/CN2014/070303, filed on Jan. 8, 2014.

(51) Int. Cl.
*H04W 4/70* (2018.01)
*H04W 8/24* (2009.01)
*H04W 72/08* (2009.01)

(52) U.S. Cl.
CPC ............. *H04W 4/70* (2018.02); *H04W 8/24* (2013.01); *H04W 72/085* (2013.01)

(58) Field of Classification Search
CPC ........ H04W 4/70; H04W 72/085; H04W 8/24
See application file for complete search history.

(56) References Cited

U.S. PATENT DOCUMENTS

| 2007/0053383 A1* | 3/2007 | Choi | H04W 48/12 370/469 |
| 2010/0057485 A1 | 3/2010 | Luft | |
| 2012/0117140 A1* | 5/2012 | Wang | H04W 4/005 709/201 |

(Continued)

FOREIGN PATENT DOCUMENTS

| CN | 102497630 A | 6/2012 | |
| JP | 2013-202774 | * 9/2013 | ............... H04W 4/06 |

(Continued)

OTHER PUBLICATIONS

Foreign Communication From a Counterpart Application, European Application No. 14878345.9, Extended European Search Report dated Jan. 4, 2017, 8 pages.

(Continued)

*Primary Examiner* — Ian N Moore
*Assistant Examiner* — Justin T Van Roie
(74) *Attorney, Agent, or Firm* — Conley Rose, P.C.

(57) ABSTRACT

A method in the machine-to-machine communications (M2M) field includes providing, by an underlying network entity, a common service entity with a communications type supported by the underlying network entity; acquiring, by the underlying network entity, a service configuration file of the common service entity when the communications type supports a cellular network; receiving, by the underlying network entity, data that needs to be sent by the common service entity; and carrying and sending, by the underlying network entity, the data by using a cellular network communication resource that is allocated according to a service configuration file.

30 Claims, 11 Drawing Sheets

(56) References Cited

U.S. PATENT DOCUMENTS

| | | |
|---|---|---|
| 2012/0203894 A1 | 8/2012 | Lee et al. |
| 2013/0188515 A1 | 7/2013 | Pinheiro et al. |
| 2013/0212236 A1 | 8/2013 | Foti et al. |
| 2015/0019717 A1* | 1/2015 | Li .................. H04L 67/1085 709/224 |
| 2016/0234656 A1* | 8/2016 | Iwai .................. H04W 4/06 |

FOREIGN PATENT DOCUMENTS

| | | | |
|---|---|---|---|
| WO | 2011098661 A1 | 8/2011 | |
| WO | 2012109531 A2 | 8/2012 | |
| WO | 2012157849 A2 | 11/2012 | |
| WO | 2013073747 A1 | 5/2013 | |
| WO | WO-2015045232 A1 * | 4/2015 | .............. H04W 4/06 |

OTHER PUBLICATIONS

Foreign Communication From a Counterpart Application, PCT Application No. PCT/CN2014/070303, English Translation of International Search Report dated Oct. 13, 2014, 2 pages.

Foreign Communication From a Counterpart Application, PCT Application No. PCT/CN2014/070303, English Translation of Written Opinion dated Oct. 13, 2014, 6 pages.

* cited by examiner

DATA SENDING METHOD, COMMON SERVICE ENTITY, AND UNDERLYING NETWORK ENTITY

CROSS-REFERENCE TO RELATED APPLICATION

This application is a continuation of International Application No. PCT/CN2014/070303 filed on Jan. 8, 2014, which is incorporated herein by reference in its entirety.

TECHNICAL FIELD

The present disclosure relates to the communications field, and in particular, to a data sending method, a common service entity, and an underlying network entity.

BACKGROUND

Machine-to-machine communications (M2M) focuses on implementing communication between machines. M2M is to be widely applied to the fields of remote monitoring, remote control, smart household, and the like. A long-distance wireless communications type supported in M2M is mainly a cellular network, and the cellular network includes various generations of mobile communications networks defined by The 3rd Generation Partnership Project (3GPP). Short-distance wireless communications types supported in M2M are mainly Wireless Fidelity (WiFi), BLUETOOTH, radio frequency technologies, and the like.

An overall objective of the European Telecommunications Standards Institute for Machine-to-Machine Communications (ETSI M2M) is to create an open standard for a service layer of M2M. For example, for an M2M system that includes an M2M device and an M2M platform, currently an interface between the M2M device and the M2M platform is already defined, and interfaces between devices on the M2M platform are already defined, and the like. In other words, communication between the M2M device and the M2M platform, and communication between the devices on the M2M platform can be implemented according to the already defined standard.

In a process of implementing the present disclosure, the inventor finds at least the following problems: for an M2M device, the M2M device includes three parts: an M2M application (application), a common service entity, and an underlying network entity, where an interface between the M2M application and the common service entity is already defined by the ETSI M2M, but an interface between the common service entity and the underlying network entity is not yet defined. That is, the M2M can communicate with the common service entity according to the already defined standard, but the common service entity cannot communicate with the underlying network entity.

SUMMARY

To resolve a problem that in an M2M device, a common service entity cannot communicate with an underlying network entity, embodiments of the present disclosure provide a data sending method, a common service entity, and an underlying network entity. The technical solutions are as follows.

According to a first aspect, a data sending method is provided, used in an underlying network entity in an M2M device, where the method includes providing a common service entity of the M2M device with a communications type supported by the underlying network entity; acquiring a service configuration file of the common service entity when the communications type supports a cellular network, where the service configuration file is used to indicate a data sending configuration when the communications type supports the cellular network; receiving data that needs to be sent by the common service entity; allocating a cellular network communication resource to the data according to the service configuration file; and carrying and sending the data by using the cellular network communication resource.

In a first possible implementation manner of the first aspect, the providing a common service entity of the M2M device with a communications type supported by the underlying network entity includes receiving a communications type request sent by the common service entity; and feeding back the communications type to the common service entity after the communications type request is received; or proactively sending the communications type to the common service entity.

With reference to the first aspect or the first possible implementation manner of the first aspect, in a second possible implementation manner, the acquiring a service configuration file of the common service entity when the communications type supports a cellular network includes receiving the service configuration file sent by the common service entity, where the service configuration file is proactively sent after the common service entity detects that the communications type supports the cellular network; or sending a configuration file acquiring request to the common service entity; and receiving the service configuration file fed back by the common service entity, where the service configuration file is fed back after the common service entity receives the configuration file acquiring request and detects that the communications type supports the cellular network; or receiving the service configuration file proactively sent by the common service entity; detecting whether the communications type supports the cellular network; and if it is detected that the communications type supports the cellular network, saving the service configuration file; or detecting whether the communications type supports the cellular network; if it is detected that the communications type supports the cellular network, sending a configuration file acquiring request to the common service entity; and receiving the service configuration file fed back by the common service entity.

In a third possible implementation manner of the first aspect, after the acquiring a service configuration file of the common service entity when the communications type supports a cellular network, the method further includes, when the data sending configuration indicated by the service configuration file includes a quantity of interactions with a network side and/or a length of a data packet during each interaction, detecting whether the quantity of interactions with the network side and/or the length of a data packet during each interaction meet/meets a predetermined transmission mode in the cellular network, where the predetermined transmission mode is a transmission mode optimized for M2M communications in the cellular network; and if it is detected that the predetermined transmission mode is met, feeding back a service access point (SAP) that is in the predetermined transmission mode to the common service entity.

With reference to the third possible implementation manner of the first aspect, in a fourth possible implementation manner, the receiving data that needs to be sent by the common service entity includes, when the SAP that is in the predetermined transmission mode is not fed back to the common service entity, receiving the data that is sent by the common service entity by using an SAP that is in a default transmission mode; or when the SAP that is in the predetermined transmission mode is fed back to the common service entity, receiving the data that is sent by the common service entity by using the SAP that is in the predetermined transmission mode.

In a fifth possible implementation manner of the first aspect, the carrying and sending the data by using the cellular network communication resource includes, when the data sending configuration indicated by the service configuration file includes a data packet transmission delay, a transmission bit error rate, and/or an identifier indicating an emergency or a non-emergency, converting the data packet transmission delay, the transmission bit error rate, and/or the identifier indicating an emergency or a non-emergency into quality of service (QOS); and adding, by using an end-to-end connection that meets the QOS and that is established to the cellular network, the data to the allocated cellular network communication resource for sending.

In a sixth possible implementation manner of the first aspect, the method further includes, when the data sending configuration indicated by the service configuration file includes a specified transmission time, being in a standby state or a power-off state in a time period that does not include the specified transmission time, and in a working state in a time period that includes the specified transmission time.

With reference to the first aspect or the first or second or third or fourth or fifth or sixth possible implementation manner, in a seventh possible implementation manner, the service configuration file carries a group of data sending configurations, where the data sending configurations include at least one parameter of: a quantity of interactions with a network side, a length of a data packet during each interaction, a data packet transmission delay, a transmission bit error rate, an identifier indicating an emergency or a non-emergency, and a specified transmission time; or the service configuration file carries a configuration identifier, where the configuration identifier is used to correspond to a group of data sending configurations, and the data sending configurations include at least one parameter of a quantity of interactions with a network side, a length of a data packet during each interaction, a data packet transmission delay, a transmission bit error rate, an identifier indicating an emergency or a non-emergency, and a specified transmission time.

With reference to the seventh possible implementation manner of the first aspect, in an eighth possible implementation manner, if the service configuration file carries a configuration identifier, the method further includes extracting the configuration identifier from the service configuration file; and querying, by using the configuration identifier, a prestored correspondence for a data sending configuration that corresponds to the configuration identifier, where the correspondence stores correspondences between different configuration identifiers and different data sending configurations.

According to a second aspect, a data sending method is provided, used in a common service entity in an M2M device, where the method includes acquiring a communications type supported by an underlying network entity from the underlying network entity of the M2M device; providing the underlying network entity with a service configuration file when the communications type supports a cellular network, where the service configuration file is used to indicate a data sending configuration when the communications type supports the cellular network; and providing the underlying network entity with data that needs to be sent, so that the underlying network entity allocates a cellular network communication resource to the data according to the service configuration file, and carries and sends the data by using the cellular network communication resource.

In a first possible implementation manner of the second aspect, the acquiring a communications type supported by an underlying network entity from the underlying network entity of the M2M device includes sending a communications type request to the underlying network entity of the M2M device; and receiving the communications type that is fed back by the underlying network entity after the communications type request is received; or receiving the communications type proactively sent by the underlying network entity.

With reference to the second aspect or the first possible implementation manner of the second aspect, in a second possible implementation manner of the second aspect, the providing the underlying network entity with a service configuration file when the communications type supports a cellular network includes detecting whether the communications type includes the cellular network; and if it is detected that the communications type includes the cellular network, proactively sending the service configuration file to the underlying network entity; or receiving a configuration file acquiring request sent by the underlying network entity; detecting whether the communications type includes the cellular network; and if it is detected that the communications type includes the cellular network, feeding back the service configuration file to the underlying network entity; or proactively sending the service configuration file to the underlying network entity, where the service configuration file is saved by the underlying network entity after the underlying network entity detects that the communications type includes the cellular network; or receiving a configuration file acquiring request sent by the underlying network entity, where the configuration file request is sent after the underlying network entity detects that the communications type includes the cellular network; and feeding back the service configuration file to the underlying network entity.

In a third possible implementation manner of the second aspect, after the providing the underlying network entity with a service configuration file when the communications type supports a cellular network, the method further includes receiving an SAP that is in a predetermined transmission mode and that is fed back by the underlying network entity, where the SAP that is in the predetermined transmission mode is fed back by the underlying network entity when it is detected, when the data sending configuration indicated by the service configuration file includes a quantity of interactions with a network side and/or a length of a data packet during each interaction, that the quantity of interactions with the network side and/or the length of a data packet during each interaction meet/meets a predetermined transmission mode in the cellular network, where the predetermined transmission mode is a transmission mode optimized for M2M communications in the cellular network.

With reference to the third possible implementation manner of the second aspect, in a fourth possible implementation manner, the providing the underlying network entity with data that needs to be sent includes, when the SAP that is in the predetermined transmission mode is not received, sending the data to the underlying network entity by using an SAP that is in a default transmission mode; or when the SAP that is in the predetermined transmission mode is received, sending the data to the underlying network entity by using the SAP that is in the predetermined transmission mode.

With reference to the second aspect or the first or second or third or fourth possible implementation manner, in a fifth possible implementation manner, the service configuration file carries a group of data sending configurations, where the data sending configurations include at least one parameter of a quantity of interactions with a network side, a length of a data packet during each interaction, a data packet transmission delay, a transmission bit error rate, an identifier indicating an emergency or a non-emergency, and a specified transmission time; or the service configuration file carries a configuration identifier, where the configuration identifier is used to correspond to a group of data sending configurations, and the data sending configurations include at least one parameter of a quantity of interactions with a network side, a length of a data packet during each interaction, a data packet transmission delay, a transmission bit error rate, an identifier indicating an emergency or a non-emergency, and a specified transmission time.

According to a third aspect, an underlying network entity is provided, used in an M2M device, where the entity includes a type providing module configured to provide a common service entity at a device service functional layer of the M2M device with a communications type supported by the underlying network entity; a file acquiring module configured to acquire a service configuration file of the common service entity when the communications type supports a cellular network, where the service configuration file is used to indicate a data sending configuration when the communications type supports the cellular network; a data receiving module configured to receive data that needs to be sent by the common service entity; a resource allocation module configured to allocate a cellular network communication resource to the data according to the service configuration file; and a data sending module configured to carry and send the data by using the cellular network communication resource.

In a first possible implementation manner of the third aspect, the type providing module includes a first receiving unit configured to receive a communications type request sent by the common service entity; and a first feedback unit configured to feed back the communications type to the common service entity after the communications type request is received; or a first sending unit configured to proactively send the communications type to the common service entity.

With reference to the third aspect or the first possible implementation manner of the third aspect, in a second possible implementation manner of the third aspect, the file acquiring module includes a second receiving unit configured to receive the service configuration file sent by the common service entity, where the service configuration file is proactively sent after the common service entity detects that the communications type supports the cellular network; or a second sending unit configured to send a configuration file acquiring request to the common service entity; and a third receiving unit configured to receive the service configuration file fed back by the common service entity, where the service configuration file is fed back after the common service entity receives the configuration file acquiring request and detects that the communications type supports the cellular network; or a fourth receiving unit configured to receive the service configuration file proactively sent by the common service entity; a first detection unit configured to detect whether the communications type supports the cellular network; and a first saving unit configured to, if it is detected that the communications type supports the cellular network, save the service configuration file; or a second detection unit configured to detect whether the communications type supports the cellular network; a third sending unit configured to, if it is detected that the communications type supports the cellular network, send a configuration file acquiring request to the common service entity; and a fifth receiving unit configured to receive the service configuration file fed back by the common service entity.

In a third possible implementation manner of the third aspect, the entity further includes a mode detection module configured to, when the data sending configuration indicated by the service configuration file includes a quantity of interactions with a network side and/or a length of a data packet during each interaction, detect whether the quantity of interactions with the network side and/or the length of a data packet during each interaction meet/meets a predetermined transmission mode in the cellular network, where the predetermined transmission mode is a transmission mode optimized for M2M communications in the cellular network; and a service feedback module configured to, if the mode detection module detects that the predetermined transmission mode is met, feed back an SAP that is in the predetermined transmission mode to the common service entity.

With reference to the third possible implementation manner of the third aspect, in a fourth possible implementation manner, the data receiving module is configured to, when the SAP that is in the predetermined transmission mode is not fed back by the service feedback module to the common service entity, receive the data that is sent by the common service entity by using an SAP that is in a default transmission mode; or the data receiving module is configured to, when the SAP that is in the predetermined transmission mode is fed back by the service feedback module to the common service entity, receive the data that is sent by the common service entity by using the SAP that is in the predetermined transmission mode.

In a fifth possible implementation manner of the third aspect, the data sending module includes a parameter conversion unit configured to, when the data sending configuration indicated by the service configuration file includes a data packet transmission delay, a transmission bit error rate, and/or an identifier indicating an emergency or a non-emergency, convert the data packet transmission delay, the transmission bit error rate, and/or the identifier indicating an emergency or a non-emergency into QOS; and a data sending unit configured to add, by using an end-to-end connection that meets the QOS and that is established to the cellular network, the data to the allocated cellular network communication resource for sending.

In a sixth possible implementation manner of the third aspect, the entity further includes a status adjustment module configured to, when the data sending configuration indicated by the service configuration file includes a specified transmission time, be in a standby state or a power-off state in a time period that does not include the specified transmission time, and in a working state in a time period that includes the specified transmission time.

With reference to the third aspect or the first or second or third or fourth or fifth or sixth possible implementation manner, in a seventh possible implementation manner, the service configuration file carries a group of data sending configurations, where the data sending configurations include at least one parameter of: a quantity of interactions with a network side, a length of a data packet during each interaction, a data packet transmission delay, a transmission bit error rate, an identifier indicating an emergency or a non-emergency, and a specified transmission time; or the service configuration file carries a configuration identifier, where the configuration identifier is used to correspond to a group of data sending configurations, and the data sending configurations include at least one parameter of: a quantity of interactions with a network side, a length of a data packet during each interaction, a data packet transmission delay, a transmission bit error rate, an identifier indicating an emergency or a non-emergency, and a specified transmission time.

With reference to the seventh possible implementation manner of the third aspect, in an eighth possible implementation manner, the entity includes an identifier extraction module configured to extract the configuration identifier from the service configuration file; and a configuration query module configured to query, by using the configuration identifier, a prestored correspondence for a data sending configuration that corresponds to the configuration identifier, where the correspondence stores correspondences between different configuration identifiers and different data sending configurations.

According to a fourth aspect, a common service entity is provided, used in an M2M device, where the entity includes a type acquiring module configured to acquire a communications type supported by an underlying network entity from the underlying network entity of the M2M device; a file providing module configured to, when the communications type supports a cellular network, provide the underlying network entity with a service configuration file, where the service configuration file is used to indicate a data sending configuration when the communications type includes the cellular network; and a data providing module configured to provide the underlying network entity with data that needs to be sent, so that the underlying network entity allocates a cellular network communication resource to the data according to the service configuration file, and carries and sends the data by using the cellular network communication resource.

In a first possible implementation manner of the fourth aspect, the type acquiring module includes a fourth sending unit configured to send a communications type request to the underlying network entity of the M2M device; and a fifth receiving unit configured to receive the communications type that is fed back by the underlying network entity after the communications type request is received; or a sixth receiving unit configured to receive the communications type proactively sent by the underlying network entity.

With reference to the fourth aspect or the first possible implementation manner of the fourth aspect, in a second possible implementation manner of the fourth aspect, the file providing module includes a third detection unit configured to detect whether the communications type includes the cellular network; and a fifth sending unit configured to, if it is detected that the communications type includes the cellular network, proactively send the service configuration file to the underlying network entity; or a seventh receiving unit configured to receive a configuration file acquiring request sent by the underlying network entity; a fourth detection unit configured to detect whether the communications type includes the cellular network; and a sixth sending unit configured to, if it is detected that the communications type includes the cellular network, feed back the service configuration file to the underlying network entity; or a seventh sending unit configured to proactively send the service configuration file to the underlying network entity, where the service configuration file is saved by the underlying network entity after the underlying network entity detects that the communications type includes the cellular network; or an eighth receiving unit configured to receive a configuration file acquiring request sent by the underlying network entity, where the configuration file request is sent after the underlying network entity detects that the communications type includes the cellular network; and an eighth sending unit configured to feed back the service configuration file to the underlying network entity.

In a third possible implementation manner of the fourth aspect, the apparatus further includes a mode receiving module configured to receive an SAP that is in a predetermined transmission mode and that is fed back by the underlying network entity, where the SAP that is in the predetermined transmission mode is fed back by the underlying network entity when it is detected, when the data sending configuration indicated by the service configuration file includes a quantity of interactions with a network side and/or a length of a data packet during each interaction, that the quantity of interactions with the network side and/or the length of a data packet during each interaction meet/meets a predetermined transmission mode in the cellular network, where the predetermined transmission mode is a transmission mode optimized for M2M communications in the cellular network.

With reference to the third possible implementation manner of the fourth aspect, in a fourth possible implementation manner, the data providing module is configured to, when the SAP that is in the predetermined transmission mode is not received by the mode receiving module, send the data to the underlying network entity by using an SAP that is in a default transmission mode; or the data providing module is configured to, when the SAP that is in the predetermined transmission mode is received by the mode receiving module, send the data to the underlying network entity by using the SAP that is in the predetermined transmission mode.

With reference to the fourth aspect or the first or second or third or fourth possible implementation manner, in a fifth possible implementation manner, the service configuration file carries a group of data sending configurations, where the data sending configurations include at least one parameter of a quantity of interactions with a network side, a length of a data packet during each interaction, a data packet transmission delay, a transmission bit error rate, an identifier indicating an emergency or a non-emergency, and a specified transmission time; or the service configuration file carries a configuration identifier, where the configuration identifier is used to correspond to a group of data sending configurations, and the data sending configurations include at least one parameter of a quantity of interactions with a network side, a length of a data packet during each interaction, a data packet transmission delay, a transmission bit error rate, an identifier indicating an emergency or a non-emergency, and a specified transmission time.

The technical solutions provided by the embodiments of the present disclosure have the following beneficial effects.

An underlying network entity in an M2M device provides a common service entity with a communications type supported by the underlying network entity; and the underlying network entity acquires a service configuration file from the common service entity, where the service configuration file is used to indicate a data sending configuration when the communications type supports a cellular network, receives data that needs to be sent by the common service entity, allocates a cellular network communication resource according to the service configuration file, and carries and sends the data by using the allocated cellular network communication resource, resolving a problem that in M2M, a common service entity cannot communicate with an underlying network entity, and achieving an effect that parameter passing and data sending are implemented between the underlying network entity and the common service entity when a communications type of the underlying network entity supports a cellular network.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the present disclosure clearer, the following further describes the embodiments of the present disclosure in detail with reference to the accompanying drawings.

Figure 1:
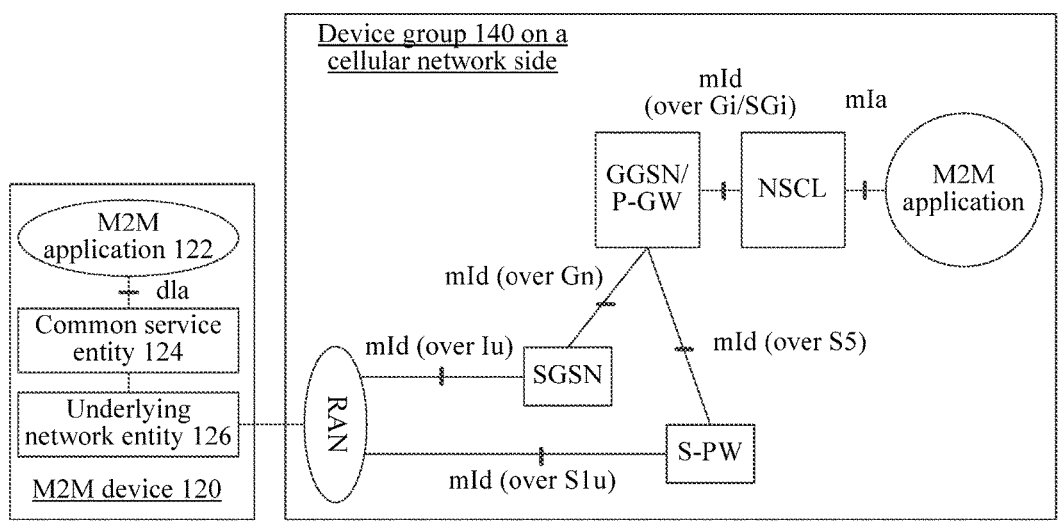
FIG. 1 is a schematic structural diagram of an implementation environment involved in data sending methods according to the embodiments of the present disclosure.

Refer to FIG. 1, which is a schematic structural diagram of an implementation environment involved in data sending methods according to the embodiments of the present disclosure. The implementation environment includes an M2M device 120 and a device group 140 that is on a cellular network side.

The M2M device 120 includes an M2M application 122, a common service entity 124, and an underlying network entity 126, where the M2M application 122 communicates with the common service entity 124 by using a dIa interface already defined by ETSI M2M; and the common service entity 124 communicates with the underlying network entity 126 by means of the data sending methods provided in the embodiments of the present disclosure.

It should be noted that the M2M device 120 may be a terminal device or a gateway device. If the M2M device 120 is a terminal device, the terminal device may be a mobile phone, an invehicle navigator, a monitor, or the like, and the common service entity 124 includes a Device Service Capability layer (DSCL) (e.g., a device service functional layer) running on the terminal device. If the M2M device 120 is a gateway device, the common service entity 124 includes a Gateway Service Capability layer (GSCL) (e.g., a gateway service functional layer) running on the gateway device.

In addition, the underlying network entity 126 is generally implemented by a communications chip in the M2M device 120 in combination with a related application program.

The device group 140 on the cellular network side refers to mobile communications devices related to a cellular network, where the cellular network covers Second Generation/Third Generation/Fourth Generation/Fifth Generation (2G/3G/4G/5G) mobile communications networks defined by 3GPP. In FIG. 1, only some devices are shown as an example for description. The device group 140 shown in FIG. 1 includes a Radio Access Network (RAN), a Serving General Packet Radio Service (GPRS) Support Node (SGSN), a Serving Gateway (S-GW), a Gateway GPRS Support Node (GGSN)/Packet-Gateway (P-GW) (e.g., a Packet Data Network Gateway (PDN-GW)), a Network Service Capability layer (NSCL), and an M2M application that is on a network side.

During an implementation of M2M communications, the RAN communicates with the SGSN by using an already defined mId (over 1u) interface, the RAN communicates with the S-GW by using an already defined mId (over S1u) interface, the SGSN communicates with the GGSN/P-GW by using an already defined mId (over Gn) interface, the S-GW communicates with the GGSN/P-GW by using an already defined mId (over S5) interface, the GGSN/P-GW communicates with the NSCL by using an already defined mId (over Gi/SGi) interface, and the NSCL communicates with the M2M application that is on the network side by using an already defined mIa interface.

It should be noted that the M2M not only supports the cellular network, but also supports other short-distance communications technologies; however, a case in which the M2M supports the short-distance communications technologies is not described in this specification, and only a case in which the cellular network is supported is described.

Figure 2:
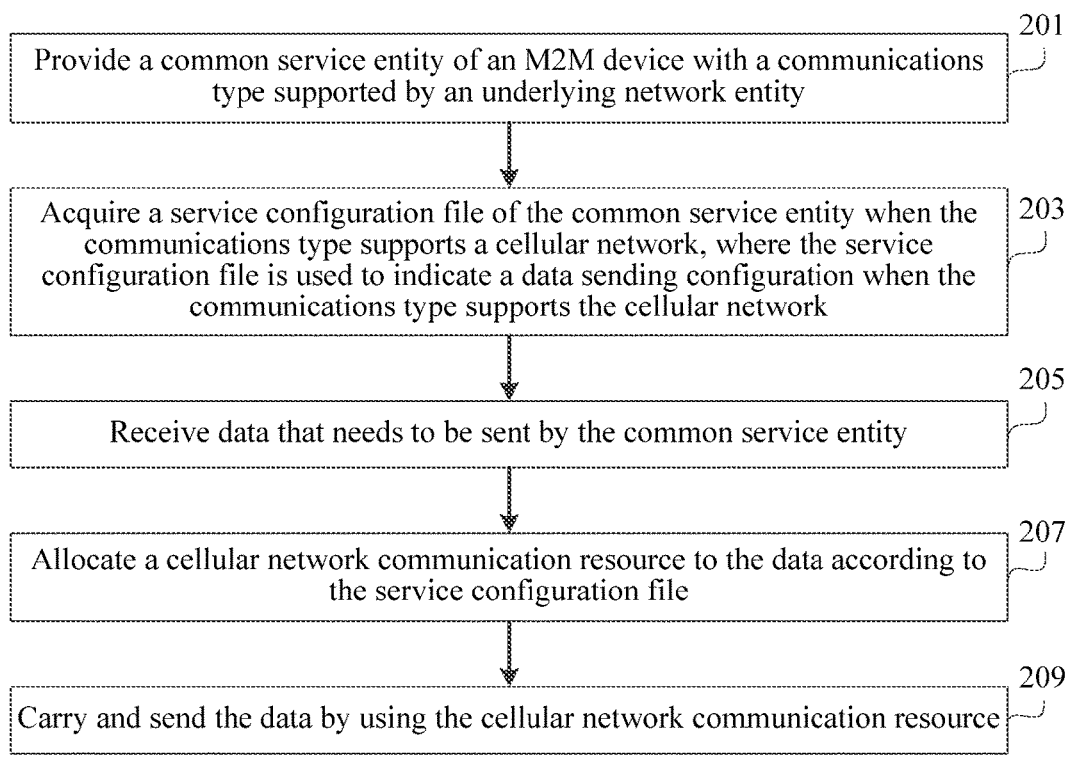
FIG. 2 is a method flowchart of a data sending method according to an embodiment of the present disclosure.

Refer to FIG. 2, which is a method flowchart of a data sending method according to an embodiment of the present disclosure. In this embodiment, description is provided by using an example in which the data sending method is applied to an underlying network entity in an M2M device shown in FIG. 1. The method includes the following steps.

Step 201. Provide a common service entity of an M2M device with a communications type supported by an underlying network entity.

The communications type supported by the underlying network entity includes a cellular network and/or a short-distance communications technology. The cellular network covers 2G/3G/4G/5G mobile communications networks defined by 3GPP. The short-distance communications technology includes WiFi, BLUETOOTH, Radio Frequency Identification (RFID), ZIGBEE, and Ultra Wideband (UWB) carrierless communications.

"Provide" herein includes the underlying network entity proactively performs reporting, or the underlying network entity performs reporting at the request of the common service entity.

Step 203. Acquire a service configuration file of the common service entity when the communications type supports a cellular network, where the service configuration file is used to indicate a data sending configuration when the communications type supports the cellular network.

The service configuration file is used to indicate the data sending configuration when the communications type supports the cellular network. In other words, the service configuration file is applicable only to a data sending process when the communications type supports the cellular network.

"Acquire" herein includes the common service entity proactively performs reporting, or the common service entity performs reporting at the request of the underlying network entity.

Step 205. Receive data that needs to be sent by the common service entity.

Step 207. Allocate a cellular network communication resource to the data according to the service configuration file.

Step 209. Carry and send the data by using the cellular network communication resource.

To sum up, according to the data sending method of this embodiment, an underlying network entity in an M2M device provides a common service entity with a communications type supported by the underlying network entity; and the underlying network entity acquires a service configuration file from the common service entity, where the service configuration file is used to indicate a data sending configuration when the communications type supports a cellular network, receives data that needs to be sent by the common service entity, allocates a cellular network communication resource to the data according to the service configuration file, carries and sends the data by using the cellular network communication resource, and carries and sends the data by using the cellular network communication resource that is allocated according to the service configuration file, resolving a problem that in M2M, a common service entity cannot communicate with an underlying network entity, and achieving an effect that parameter passing and data sending are implemented between the underlying network entity and the common service entity when a communications type of the underlying network entity supports a cellular network.

Figure 3:
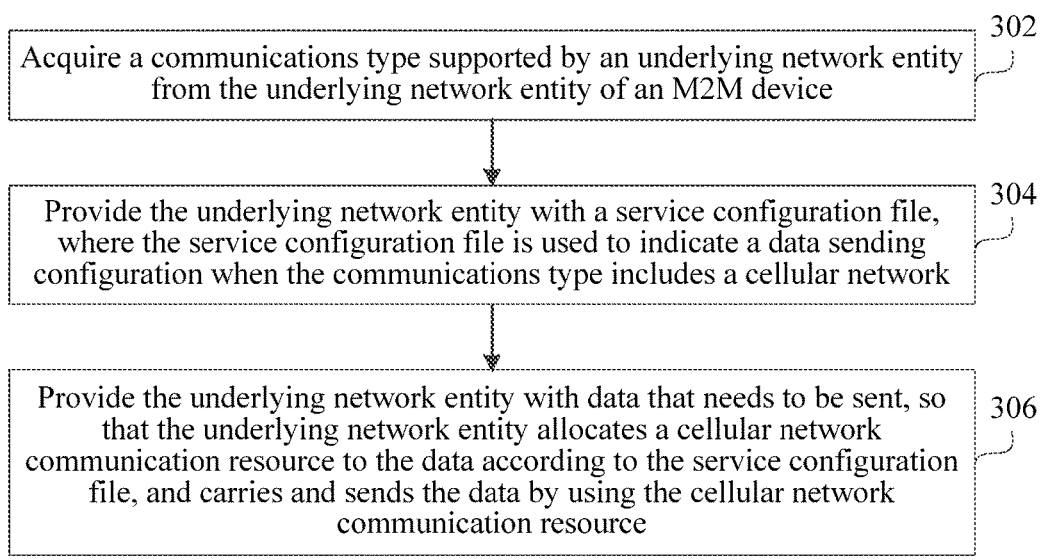
FIG. 3 is a method flowchart of a data sending method according to another embodiment of the present disclosure.

Refer to FIG. 3, which is a method flowchart of a data sending method according to another embodiment of the present disclosure. In this embodiment, description is provided by using an example in which the data sending method is applied to a common service entity in an M2M device shown in FIG. 1. The method includes the following steps.

Step 302. Acquire a communications type supported by an underlying network entity from the underlying network entity of an M2M device.

The communications type supported by the underlying network entity includes a cellular network and/or a short-distance communications technology. The cellular network covers 2G/3G/4G/5G mobile communications networks defined by 3GPP. The short-distance communications technology includes WiFi, BLUETOOTH, RFID, ZIGBEE, and UWB.

"Acquire" herein includes the underlying network entity proactively performs reporting, or the underlying network entity performs reporting at the request of the common service entity.

Step 304. Provide the underlying network entity with a service configuration file when the communications type supports a cellular network, where the service configuration file is used to indicate a data sending configuration when the communications type includes the cellular network.

The service configuration file is used to indicate the data sending configuration when the communications type supports the cellular network. In other words, the service configuration file is applicable only to a data sending process when the communications type supports the cellular network.

"Provide" herein includes the common service entity proactively performs reporting, or the common service entity performs reporting at the request of the underlying network entity.

Step 306. Provide the underlying network entity with data that needs to be sent, so that the underlying network entity allocates a cellular network communication resource to the data according to the service configuration file, and carries and sends the data by using the allocated cellular network communication resource.

To sum up, according to the data sending method of this embodiment, a common service entity in an M2M device acquires a communications type supported by an underlying network entity from the underlying network entity; and the common service entity provides the underlying network entity with a service configuration file when the communications type supports a cellular network, where the service configuration file is used to indicate a data sending configuration when the communications type supports the cellular network, and provides the underlying network entity with data that needs to be sent, so that the underlying network entity carries and sends the data by using a cellular network communication resource that is allocated according to the service configuration file, resolving a problem that in M2M, a common service entity cannot communicate with an underlying network entity, and achieving an effect that parameter passing and data sending are implemented between the underlying network entity and the common service entity when a communications type of the underlying network entity supports a cellular network.

Figure 4A:
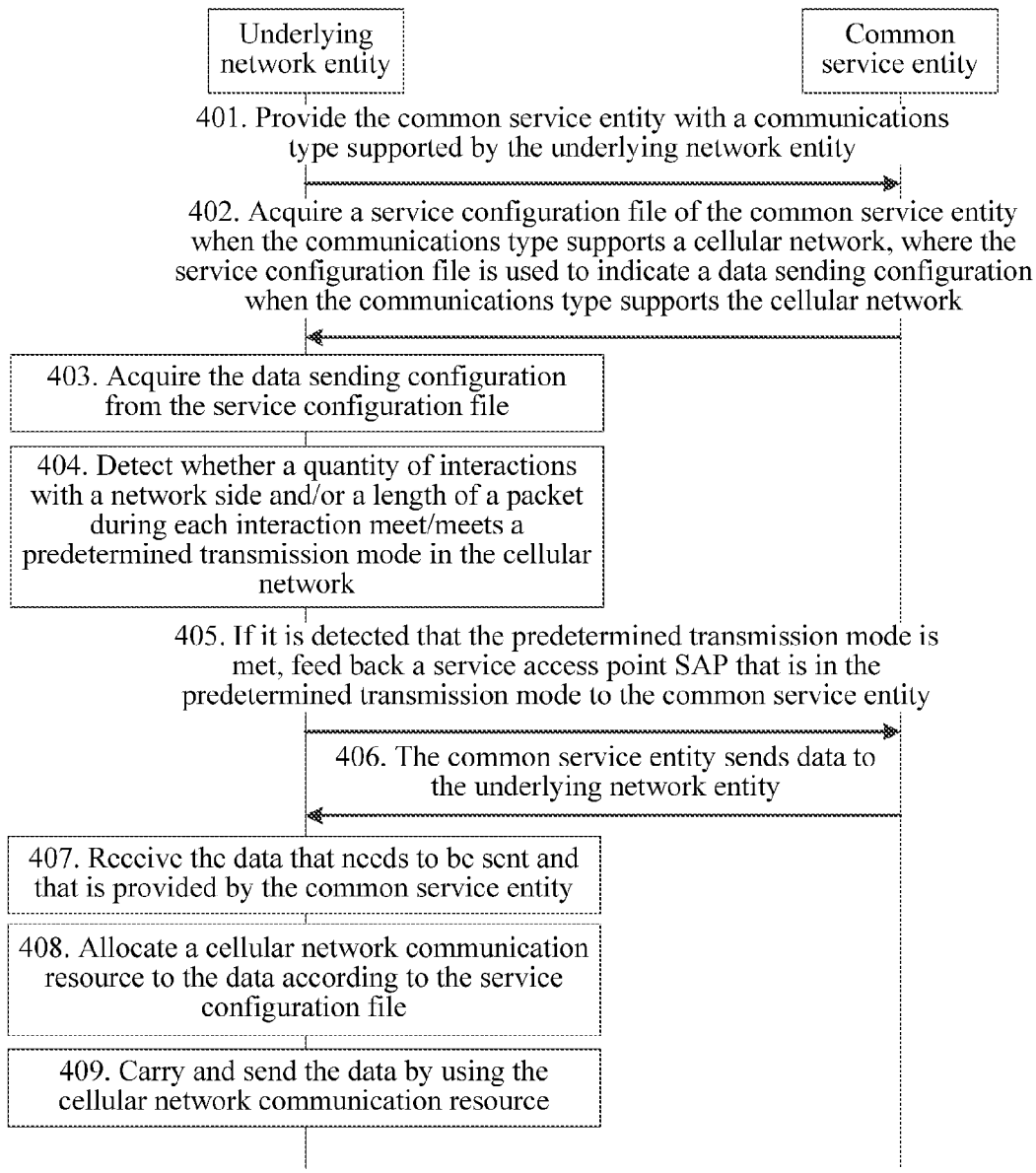
FIG. 4A is a method flowchart of a data sending method according to another embodiment of the present disclosure.

Refer to FIG. 4A, which is a method flowchart of a data sending method according to another embodiment of the present disclosure. In this embodiment, description is provided by using an example in which the data sending method is applied between a common service entity and an underlying network entity that are in an M2M device shown in FIG. 1.

Step 401. An underlying network entity provides a common service entity with a communications type supported by the underlying network entity.

An underlying network entity in each M2M device supports different communications types, and the communications type that may be supported by the underlying network entity includes a cellular network and/or a short-distance communications technology. The cellular network covers 2G/3G/4G/5G mobile communications networks defined by 3GPP. The short-distance communications technology includes WiFi, BLUETOOTH, RFID, ZIGBEE, and UWB. From a side of the common service entity, the common service entity needs to acquire the communications type supported by the underlying network entity from the underlying network entity of the M2M device.

This step may be implemented in either of the following two manners.

Figure 4B:
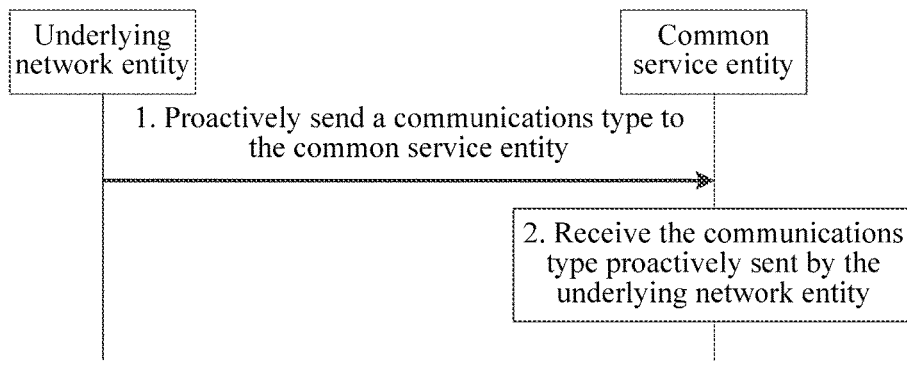
FIG. 4B and FIG. 4C are method flowcharts of two different implementation manners of step 401 that is provided in the embodiment of FIG. 4A.

First, refer to FIG. 4B for a manner of proactively performing reporting by the underlying network entity.

1. The underlying network entity proactively sends the communications type to the common service entity.

The communications type may be added to a communications type support response (Report supported communications type).

2. The common service entity receives the communications type proactively sent by the underlying network entity.

Figure 4C:
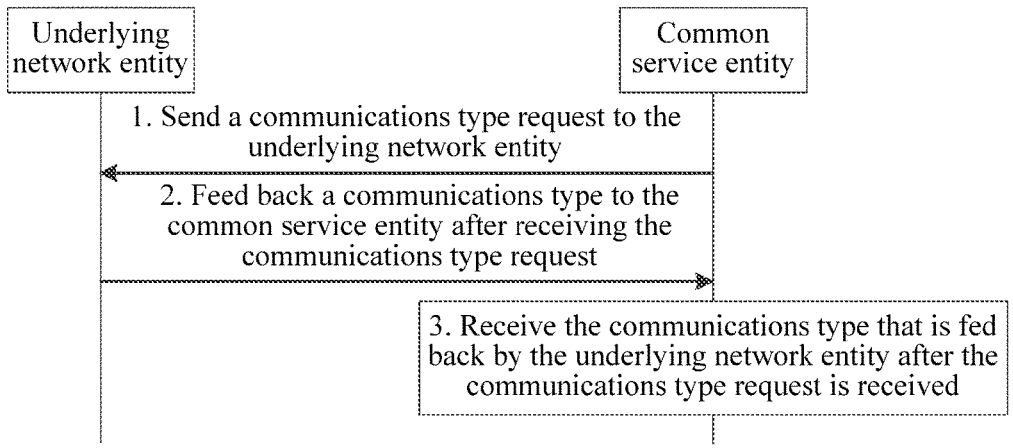

Second, refer to FIG. 4C for a manner of performing reporting by the underlying network entity at the request of the common service entity.

1. The common service entity sends a communications type request (Request communications type) to the underlying network entity.

Correspondingly, the underlying network entity receives the communications type request sent by the common service entity.

2. The underlying network entity feeds back the communications type to the common service entity after receiving the communications type request.

The communications type may be added to a communications type support response (Report supported communications type).

3. The common service entity receives the communications type that is fed back by the underlying network entity after the communications type request is received.

Step 402. The underlying network entity acquires a service configuration file of the common service entity when the communications type supports a cellular network, where the service configuration file is used to indicate a data sending configuration when the communications type supports the cellular network.

When the communications type supports the cellular network, the common service entity may provide the underlying network entity with a service configuration file (Service Profile). The service configuration file is used to indicate the data sending configuration when the communications type supports the cellular network. In other words, the common service entity provides the underlying network entity with the service configuration file only when the communications type supports the cellular network.

This step may be implemented in any one of the following four manners.

Figure 4D:
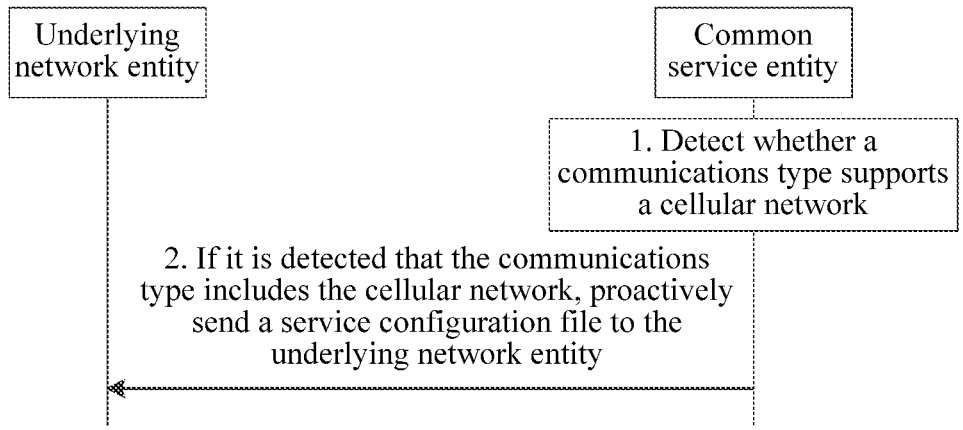
FIG. 4D, FIG. 4E, FIG. 4F and FIG. 4G are method flowcharts of four different implementation manners of step 402 that is provided in the embodiment of FIG. 4A.

First, as shown in FIG. 4D, the common service entity proactively performs reporting, and the common service entity detects whether reporting needs to be performed.

1) The common service entity detects whether the communications type supports the cellular network.

2) If it is detected that the communications type supports the cellular network, the common service entity proactively sends the service configuration file to the underlying network entity.

Correspondingly, the underlying network entity receives the service configuration file sent by the common service entity, where the service configuration file is proactively sent after the common service entity detects that the communications type supports the cellular network. The service configuration file may be added to a service configuration file support response (Report Supported Service Profile) and the service configuration file support response is sent.

Figure 4E:
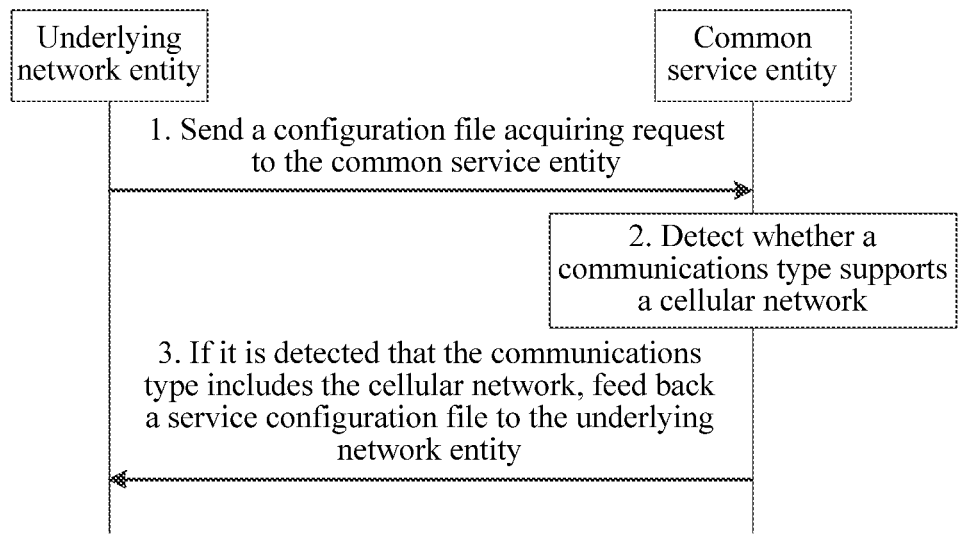

Second, as shown in FIG. 4E, the common service entity performs reporting at the request of the underlying network entity, and the common service entity detects whether reporting needs to be performed.

1) The underlying network entity sends a configuration file acquiring request (Request Application Service Profile) to the common service entity.

Correspondingly, the common service entity receives the configuration file acquiring request sent by the underlying network entity.

2) The common service entity detects whether the communications type supports the cellular network.

3) If it is detected that the communications type supports the cellular network, the common service entity feeds back the service configuration file to the underlying network entity.

Correspondingly, the underlying network entity receives the service configuration file fed back by the common service entity, where the service configuration file is fed back after the common service entity receives the configuration file acquiring request and detects that the communications type supports the cellular network.

Figure 4F:
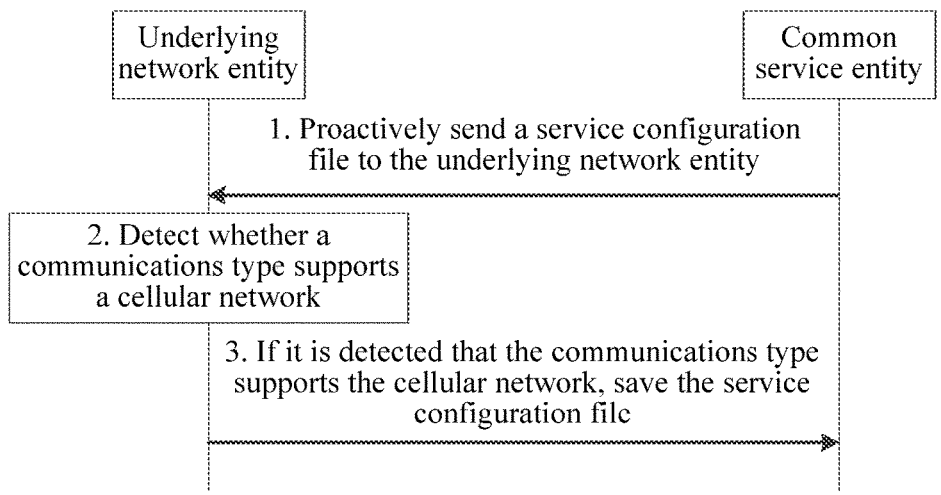

Third, as shown in FIG. 4F, the common service entity proactively performs reporting, and the underlying network entity detects whether saving is performed.

1) The common service entity proactively sends a service configuration file to the underlying network entity.

The service configuration file is to be saved by the underlying network entity after the underlying network entity detects that the communications type supports the cellular network.

Correspondingly, the underlying network entity receives the service configuration file proactively sent by the common service entity.

2) The underlying network entity detects whether the communications type supports the cellular network.

3) If it is detected that the communications type supports the cellular network, the underlying network entity saves the service configuration file.

Figure 4G:
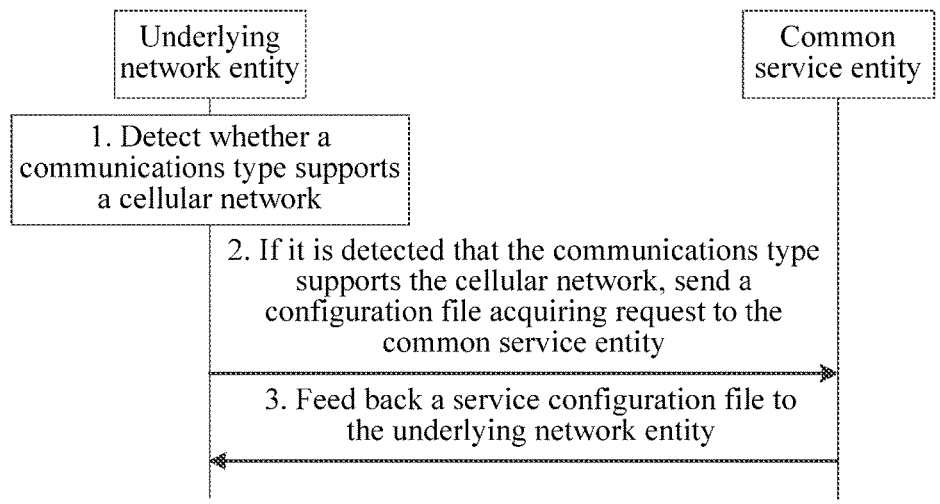

Fourth, as shown in FIG. 4G, the underlying network entity detects whether reporting needs to be performed, and the common service entity performs reporting at the request of the underlying network entity.

1) The underlying network entity detects whether the communications type supports the cellular network.

2) If it is detected that the communications type supports the cellular network, the underlying network entity sends a configuration file acquiring request to the common service entity.

Correspondingly, the common service entity receives the configuration file acquiring request sent by the underlying network entity, where the configuration file request is sent after the underlying network entity detects that the communications type supports the cellular network.

3) The common service entity feeds back a service configuration file to the underlying network entity.

Correspondingly, the underlying network entity receives the service configuration file fed back by the common service entity.

It should be noted that the data sending configuration indicated by the service configuration file includes at least one parameter of a quantity of interactions with a network side, a length of a data packet during each interaction, a data packet transmission delay, a transmission bit error rate, an identifier indicating an emergency or a non-emergency, and a specified transmission time. The quantity of interactions with the network side mainly refers to a quantity of needed interactions of a D/GSCL with an NSCL/M2M application in the device group 140 in FIG. 1. The data packet transmission delay, the transmission bit error rate, and the identifier indicating an emergency or a non-emergency are related to QOS required by a service. The specified transmission time refers to sending data at a specific point of time.

For example, a group of data sending configurations are a quantity of interactions with a network side is 2, a length of a data packet during each interaction<100 bytes, a data packet transmission delay<10 minutes (min), and a specified transmission time is 12:00 every day.

The service configuration file may directly carry a group of data sending configurations. Alternatively, the service configuration file carries a configuration identifier, where the configuration identifier is used to correspond to a group of data sending configurations. For example, a configuration identifier 0001 represents the group of data sending configurations in the foregoing example. The later implementation manner can reduce a data volume that needs to be carried by the service configuration file; however, the common service entity and the underlying network entity need to prestore correspondences between different configuration identifiers and different data sending configurations.

Step 403. The underlying network entity acquires the data sending configuration from the service configuration file.

If the service configuration file directly carries a group of data sending configurations, the underlying network entity parses out the data sending configurations from the service configuration file.

For example, the underlying network entity directly parses out, from the service configuration file, the data sending configurations a quantity of interactions with a network side is 2, a length of a data packet during each interaction<100 bytes, a data packet transmission delay<10 min, and a specified transmission time is 12:00 every day.

If the service configuration file carries a configuration identifier, the underlying network entity extracts the configuration identifier from the service configuration file, and queries, by using the configuration identifier, a prestored correspondence for a data sending configuration that corresponds to the configuration identifier, where the correspondence stores correspondences between different configuration identifiers and different data sending configurations.

For example, the underlying network entity parses out a configuration identifier 0001 from the service configuration file, and then queries the prestored correspondence for the corresponding data sending configurations a quantity of interactions with a network side is 2, a length of a data packet during each interaction<100 bytes, a data packet transmission delay<10 min, and a specified transmission time is 12:00 every day.

Step 404. The underlying network entity detects whether a quantity of interactions with a network side and/or a length of a data packet during each interaction meet/meets a predetermined transmission mode in the cellular network.

When the data sending configuration includes the quantity of interactions with the network side and/or the length of a data packet during each interaction, the underlying network entity detects whether the quantity of interactions with the network side and/or the length of a data packet during each interaction meet/meets the predetermined transmission mode in the cellular network, where the predetermined transmission mode is a transmission mode optimized for M2M communications in the cellular network.

The predetermined transmission mode may be a small data transmission mode in a 3GPP network.

Step 405. If it is detected that the predetermined transmission mode is met, the underlying network entity feeds back an SAP that is in the predetermined transmission mode to the common service entity.

Correspondingly, the common service entity receives the SAP that is in the predetermined transmission mode and that is fed back by the underlying network entity, where the SAP that is in the predetermined transmission mode is fed back by the underlying network entity when it is detected, when the data sending configuration includes a quantity of interactions with a network side and/or a length of a data packet during each interaction, that the quantity of interactions with the network side and/or the length of a data packet during each interaction meet/meets the predetermined transmission mode in the cellular network.

If it is detected that the predetermined transmission mode is not met, the underlying network entity may not perform processing.

Step 406. The common service entity sends data to the underlying network entity.

This step may include the following substeps.

When the SAP that is in the predetermined transmission mode and that is sent by the underlying network entity is not received by the common service entity, the common service entity sends the data to the underlying network entity by using an SAP that is in a default transmission mode.

When the SAP that is in the predetermined transmission mode and that is fed back by the underlying network entity is received by the common service entity, the common service entity sends the data to the underlying network entity by using the SAP that is in the predetermined transmission mode.

Step 407. The underlying network entity receives the data that needs to be sent and that is provided by the common service entity.

When the SAP that is in the predetermined transmission mode is not fed back to the common service entity, the underlying network entity receives the data that is sent by the common service entity by using the SAP that is in the default transmission mode.

When the SAP that is in the predetermined transmission mode is fed back to the common service entity, the underlying network entity receives the data that is sent by the common service entity by using the SAP that is in the predetermined transmission mode.

Step 408. The underlying network entity allocates a cellular network communication resource to the data according to the service configuration file.

According to different SAPs used by the common service entity, the cellular network communication resource allocated by the underlying network entity to the common service entity is a communication resource in the default transmission mode or a communication resource in the predetermined transmission mode.

Step 409. The underlying network entity carries and sends the data by using the cellular network communication resource.

This step may include the following substeps.

1) When the data sending configuration indicated by the service configuration file includes a data packet transmission delay, a transmission bit error rate, and/or an identifier indicating an emergency or a non-emergency, the underlying network entity converts the data packet transmission delay, the transmission bit error rate, and/or the identifier indicating an emergency or a non-emergency into QOS.

2) The underlying network entity adds, by using an end-to-end connection that meets the QOS and that is established to the cellular network, the data to the allocated cellular network communication resource for sending.

It should be noted that when the data sending configuration indicated by the service configuration file includes a specified transmission time, the underlying network entity may be in a standby state or a power-off state in a time period that does not include the specified transmission time, and in a working state in a time period that includes the specified transmission time.

To sum up, according to the data sending method of this embodiment, an underlying network entity in an M2M device provides a common service entity with a communications type supported by the underlying network entity; and the underlying network entity acquires a service configuration file of the common service entity when the communications type supports a cellular network, where the service configuration file is used to indicate a data sending configuration when the communications type supports the cellular network, receives data that needs to be sent by the common service entity, and carries and sends the data by using a cellular network communication resource that is allocated according to the service configuration file, resolving a problem that in M2M, a common service entity cannot communicate with an underlying network entity, and achieving an effect that parameter passing and data sending are implemented between the underlying network entity and the common service entity when a communications type of the underlying network entity supports a cellular network.

According to the data sending method provided in this embodiment, a configuration identifier is carried by a service configuration file, and a data volume that needs to be carried by the service configuration file is further reduced, so that communication between an underlying network entity and a common service entity is rapider and more effective.

According to the data sending method provided in this embodiment, an underlying network entity is enabled to be in a standby state or a power-off state in a time period that does not include a specified transmission time, so that energy consumption of the underlying network entity is reduced, and endurance of an M2M device is increased, which is relatively more applicable to a scenario in which the M2M device is a wireless monitoring device.

The steps, which are executed by the underlying network entity, in this embodiment may be separately implemented as a data sending method on a side of the underlying network entity, and the steps, which are executed by the common service entity, in this embodiment may be separately implemented as a data sending method on a side of the common service entity.

The following is an apparatus embodiment in the embodiments of the present disclosure, and for parts not described in detail in the apparatus embodiment, reference may be made to the foregoing method embodiment that corresponds to the apparatus embodiment.

Figure 5:
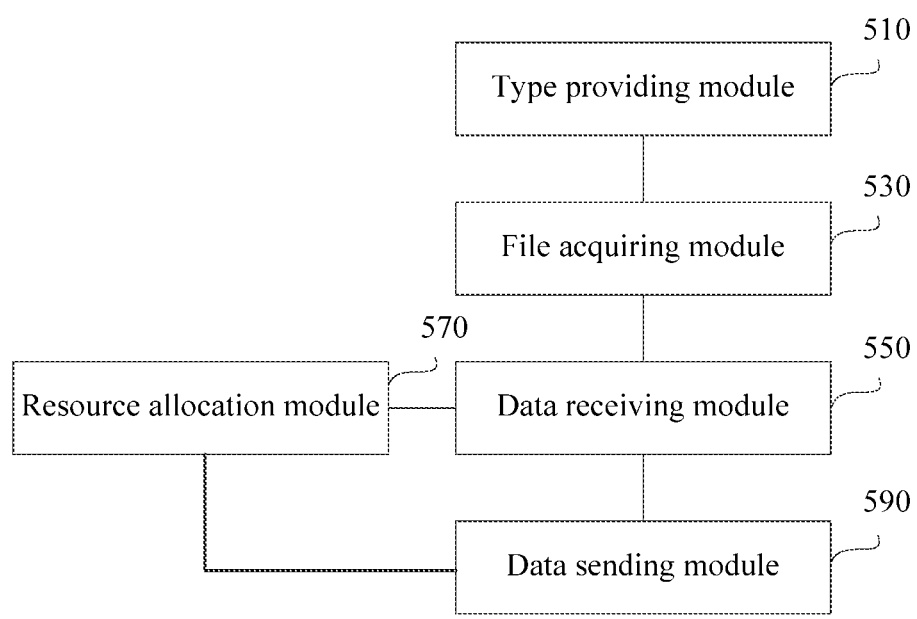
FIG. 5 is a schematic structural diagram of an underlying network entity according to an embodiment of the present disclosure.

Refer to FIG. 5, which is a schematic structural diagram of an underlying network entity according to an embodiment of the present disclosure. The underlying network entity may be a data sending apparatus implemented by software, hardware, and a combination thereof in an M2M device. The underlying network entity includes a type providing module 510 configured to provide a common service entity of the M2M device with a communications type supported by the underlying network entity; a file acquiring module 530 configured to acquire a service configuration file of the common service entity when the communications type supports a cellular network, where the service configuration file is used to indicate a data sending configuration when the communications type supports the cellular network; a data receiving module 550 configured to receive data that needs to be sent by the common service entity; a resource allocation module 570 configured to allocate a cellular network communication resource to the data according to the service configuration file; and a data sending module 590 configured to carry and send the data by using the cellular network communication resource.

To sum up, according to the data sending apparatus of this embodiment, an underlying network entity in an M2M device provides a common service entity with a communications type supported by the underlying network entity; and the underlying network entity acquires a service configuration file of the common service entity when the communications type supports a cellular network, where the service configuration file is used to indicate a data sending configuration when the communications type supports the cellular network, receives data that needs to be sent by the common service entity, and carries and sends the data by using a cellular network communication resource that is allocated according to the service configuration file, resolving a problem that in M2M, a common service entity cannot communicate with an underlying network entity, and achieving an effect that parameter passing and data sending are implemented between the underlying network entity and the common service entity when a communications type of the underlying network entity supports a cellular network.

It should be additionally noted that the data receiving module 550 may be implemented by a receiver in a communications chip; the data sending module 590 may be implemented by a transmitter in the communications chip; and the type providing module 510, the file acquiring module 530, and the resource allocation module 570 may be implemented by a controller in the communications chip.

Figure 6:
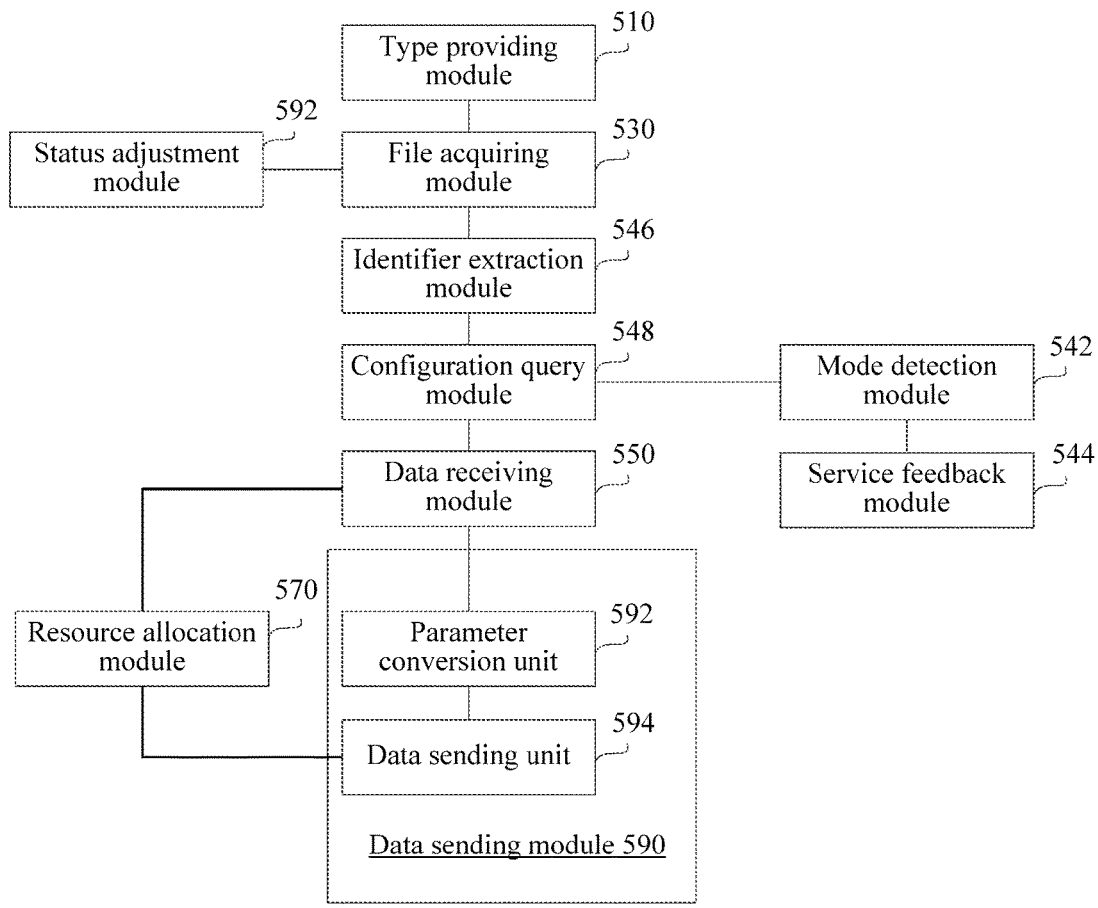
FIG. 6 is a schematic structural diagram of an underlying network entity according to another embodiment of the present disclosure.

Refer to FIG. 6, which is a schematic structural diagram of an underlying network entity according to an embodiment of the present disclosure. The underlying network entity may be a data sending apparatus implemented by software, hardware, and a combination thereof in an M2M device. The underlying network entity includes a type providing module 510 configured to provide a common service entity at a device service functional layer of the M2M device with a communications type supported by the underlying network entity; a file acquiring module 530 configured to acquire a service configuration file of the common service entity when the communications type supports a cellular network, where the service configuration file is used to indicate a data sending configuration when the communications type supports the cellular network; a data receiving module 550 configured to receive data that needs to be sent by the common service entity; a resource allocation module 570 configured to allocate a cellular network communication resource to the data according to the service configuration file; and a data sending module 590 configured to carry and send the data by using the cellular network communication resource.

The type providing module 510 includes a first receiving unit configured to receive a communications type request sent by the common service entity; and a first feedback unit configured to feed back the communications type to the common service entity after the communications type request is received; or a first sending unit configured to proactively send the communications type to the common service entity.

The file acquiring module 530 includes a second receiving unit configured to receive the service configuration file sent by the common service entity, where the service configuration file is proactively sent after the common service entity detects that the communications type supports the cellular network; or a second sending unit configured to send a configuration file acquiring request to the common service entity; and a third receiving unit configured to receive the service configuration file fed back by the common service entity, where the service configuration file is fed back after the common service entity receives the configuration file acquiring request and detects that the communications type supports the cellular network; or a fourth receiving unit configured to receive the service configuration file proactively sent by the common service entity; a first detection unit configured to detect whether the communications type supports the cellular network; and a first saving unit configured to, if it is detected that the communications type supports the cellular network, save the service configuration file; or a second detection unit configured to detect whether the communications type supports the cellular network; a third sending unit configured to, if it is detected that the communications type supports the cellular network, send a configuration file acquiring request to the common service entity; and a fifth receiving unit configured to receive the service configuration file fed back by the common service entity.

The service configuration file carries a group of data sending configurations, where the data sending configurations include at least one parameter of a quantity of interactions with a network side, a length of a data packet during each interaction, a data packet transmission delay, a transmission bit error rate, an identifier indicating an emergency or a non-emergency, and a specified transmission time; or the service configuration file carries a configuration identifier, where the configuration identifier is used to correspond to a group of data sending configurations, and the data sending configurations include at least one parameter of: a quantity of interactions with a network side, a length of a data packet during each interaction, a data packet transmission delay, a transmission bit error rate, an identifier indicating an emergency or a non-emergency, and a specified transmission time.

The entity further includes a mode detection module 542 configured to, when the data sending configuration indicated by the service configuration file includes a quantity of interactions with a network side and/or a length of a data packet during each interaction, detect whether the quantity of interactions with the network side and/or the length of a data packet during each interaction meet/meets a predetermined transmission mode in the cellular network, where the predetermined transmission mode is a transmission mode optimized for M2M communications in the cellular network; and a service feedback module 544 configured to, if the mode detection module detects that the predetermined transmission mode is met, feed back an SAP that is in the predetermined transmission mode to the common service entity.

The data receiving module 550 is configured to, when the SAP that is in the predetermined transmission mode is not fed back by the service feedback module 544 to the common service entity, receive the data that is sent by the common service entity by using an SAP that is in a default transmission mode; or the data receiving module 550 is configured to, when the SAP that is in the predetermined transmission mode is fed back by the service feedback module 544 to the common service entity, receive the data that is sent by the common service entity by using the SAP that is in the predetermined transmission mode.

The data sending module 590 includes a parameter conversion unit 592 configured to, when the data sending configuration indicated by the service configuration file includes a data packet transmission delay, a transmission bit error rate, and/or an identifier indicating an emergency or a non-emergency, convert the data packet transmission delay, the transmission bit error rate, and/or the identifier indicating an emergency or a non-emergency into QOS; and a data sending unit 594 configured to add, by using an end-to-end connection that meets the QOS and that is established to the cellular network, the data to the allocated cellular network communication resource for sending.

If the service configuration file carries a configuration identifier, the entity includes an identifier extraction module 546 configured to extract the configuration identifier from the service configuration file; and a configuration query module 548 configured to query, by using the configuration identifier, a prestored correspondence for a data sending configuration that corresponds to the configuration identifier, where the correspondence stores correspondences between different configuration identifiers and different data sending configurations.

The apparatus further includes a status adjustment module 592 configured to, when the data sending configuration indicated by the service configuration file includes a specified transmission time, be in a standby state or a power-off state in a time period that does not include the specified transmission time, and in a working state in a time period that includes the specified transmission time.

To sum up, according to the underlying network entity of this embodiment, the underlying network entity in an M2M device provides a common service entity with a communications type supported by the underlying network entity; and the underlying network entity acquires a service configuration file of the common service entity when the communications type supports a cellular network, where the service configuration file is used to indicate a data sending configuration when the communications type supports the cellular network, receives data that needs to be sent by the common service entity, and carries and sends the data by using a cellular network communication resource that is allocated according to the service configuration file, resolving a problem that in M2M, a common service entity cannot communicate with an underlying network entity, and achieving an effect that parameter passing and data sending are implemented between the underlying network entity and the common service entity when a communications type of the underlying network entity supports a cellular network.

The underlying network entity provided in this embodiment further reduces, by adding a configuration identifier to a service configuration file, a data volume that needs to be carried by the service configuration file, so that communication between an underlying network entity and a common service entity is rapider and more effective.

According to the underlying network entity provided in this embodiment, the underlying network entity is enabled to be in a standby state or a power-off state in a time period that does not include a specified transmission time, so that energy consumption of the underlying network entity is reduced, and endurance of an M2M device is increased, which is relatively more applicable to a scenario in which the M2M device is a wireless monitoring device.

It should be additionally noted that the data receiving module 550 may be implemented by a receiver in a communications chip; the data sending module 590 may be implemented by a transmitter in the communications chip; and the type providing module 510, the file acquiring module 530, the mode detection module 542, the service feedback module 544, the resource allocation module 570, the identifier extraction module 546, the configuration query module 548, and the status adjustment module 592 may be implemented by a controller in the communications chip.

Figure 7:
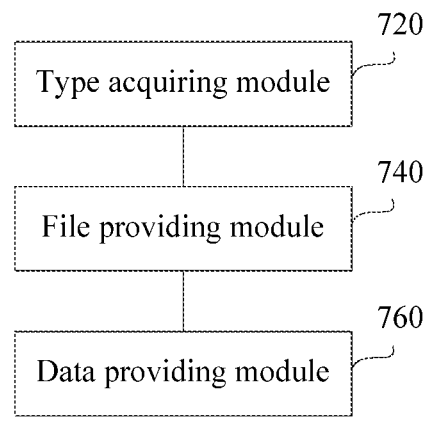
FIG. 7 is a schematic structural diagram of a common service entity according to an embodiment of the present disclosure.

Refer to FIG. 7, which is a schematic structural diagram of a common service entity according to an embodiment of the present disclosure. The common service entity may be implemented as a data sending apparatus in an M2M device by software, hardware, and a combination thereof. The common service entity includes a type acquiring module 720 configured to acquire a communications type supported by an underlying network entity from the underlying network entity of the M2M device; a file providing module 740 configured to, when the communications type supports a cellular network, acquire a service configuration file of the underlying network entity, that is, provide the underlying network entity with a service configuration file, where the service configuration file is used to indicate a data sending configuration when the communications type includes the cellular network; and a data providing module 760 configured to provide the underlying network entity with data that needs to be sent, so that the underlying network entity allocates a cellular network communication resource to the data according to the service configuration file, and carries and sends the data by using the cellular network communication resource.

To sum up, according to the common service entity of this embodiment, the common service entity in an M2M device acquires a communications type supported by an underlying network entity from the underlying network entity; and the common service entity provides the underlying network entity with a service configuration file when the communications type supports a cellular network, where the service configuration file is used to indicate a data sending configuration when the communications type supports the cellular network, and provides the underlying network entity with data that needs to be sent, so that the underlying network entity carries and sends the data by using a cellular network communication resource that is allocated according to the service configuration file, resolving a problem that in M2M, a common service entity cannot communicate with an underlying network entity, and achieving an effect that parameter passing and data sending are implemented between the underlying network entity and the common service entity when a communications type of the underlying network entity supports a cellular network.

It should be additionally noted that the type acquiring module 720 may be implemented by a receiver in the M2M device; the data providing module 760 may be implemented by a transmitter in the M2M device; and the file providing module 740 may be implemented by a processor in the M2M device.

Figure 8:
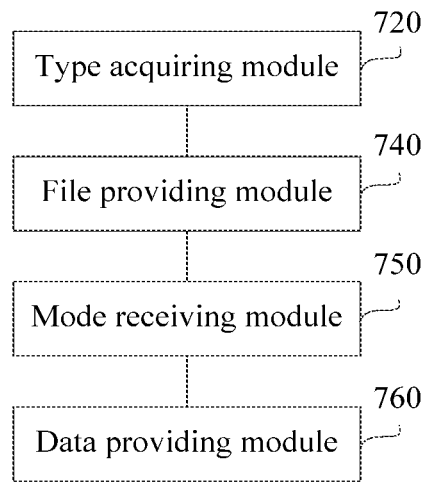
FIG. 8 is a schematic structural diagram of a common service entity according to another embodiment of the present disclosure.

Refer to FIG. 8, which is a schematic structural diagram of a common service entity according to an embodiment of the present disclosure. The common service entity may be implemented as a data sending apparatus in an M2M device by software, hardware, and a combination thereof. The common service entity includes a type acquiring module 720 configured to acquire a communications type supported by an underlying network entity from the underlying network entity of the M2M device; a file providing module 740 configured to, when the communications type supports a cellular network, provide the underlying network entity with a service configuration file, where the service configuration file is used to indicate a data sending configuration when the communications type includes the cellular network; and a data providing module 760 configured to provide the underlying network entity with data that needs to be sent, so that the underlying network entity allocates a cellular network communication resource to the data according to the service configuration file, and carries and sends the data by using the cellular network communication resource.

The type acquiring module 720 includes a fourth sending unit configured to send a communications type request to the underlying network entity of the M2M device; and a fifth receiving unit configured to receive the communications type that is fed back by the underlying network entity after the communications type request is received; or a sixth receiving unit configured to receive the communications type proactively sent by the underlying network entity.

The file providing module includes a third detection unit configured to detect whether the communications type supports the cellular network; and a fifth sending unit configured to, if it is detected that the communications type supports the cellular network, proactively send the service configuration file to the underlying network entity; or a seventh receiving unit configured to receive a configuration file acquiring request sent by the underlying network entity; a fourth detection unit configured to detect whether the communications type supports the cellular network; and a sixth sending unit configured to, if it is detected that the communications type supports the cellular network, feed back the service configuration file to the underlying network entity; or a seventh sending unit configured to proactively send the service configuration file to the underlying network entity, where the service configuration file is saved by the underlying network entity after the underlying network entity detects that the communications type supports the cellular network; or an eighth receiving unit configured to receive a configuration file acquiring request sent by the underlying network entity, where the configuration file request is sent after the underlying network entity detects that the communications type supports the cellular network; and an eighth sending unit configured to feed back the service configuration file to the underlying network entity.

Herein, the service configuration file carries a group of data sending configurations, where the data sending configurations include at least one parameter of: a quantity of interactions with a network side, a length of a data packet during each interaction, a data packet transmission delay, a transmission bit error rate, an identifier indicating an emergency or a non-emergency, and a specified transmission time; or the service configuration file carries a configuration identifier, where the configuration identifier is used to correspond to a group of data sending configurations, and the data sending configurations include at least one parameter of a quantity of interactions with a network side, a length of a data packet during each interaction, a data packet transmission delay, a transmission bit error rate, an identifier indicating an emergency or a non-emergency, and a specified transmission time.

The entity further includes a mode receiving module 750 configured to receive an SAP that is in a predetermined transmission mode and that is fed back by the underlying network entity, where the SAP that is in the predetermined transmission mode is fed back by the underlying network entity when it is detected, when the data sending configuration indicated by the service configuration file includes a quantity of interactions with a network side and/or a length of a data packet during each interaction, that the quantity of interactions with the network side and/or the length of a data packet during each interaction meet/meets a predetermined transmission mode in the cellular network, where the predetermined transmission mode is a transmission mode optimized for M2M communications in the cellular network.

The data providing module 760 is configured to, when the SAP that is in the predetermined transmission mode is not received by the mode receiving module 750, send the data to the underlying network entity by using an SAP that is in a default transmission mode; or the data providing module 760 is configured to, when the SAP that is in the predetermined transmission mode is received by the mode receiving module 750, send the data to the underlying network entity by using the SAP that is in the predetermined transmission mode.

To sum up, according to the common service entity of this embodiment, the common service entity in an M2M device acquires a communications type supported by an underlying network entity from the underlying network entity; and the common service entity provides the underlying network entity with a service configuration file when the communications type supports a cellular network, where the service configuration file is used to indicate a data sending configuration when the communications type supports the cellular network, and provides the underlying network entity with data that needs to be sent, so that the underlying network entity carries and sends the data by using a cellular network communication resource that is allocated according to the service configuration file, resolving a problem that in M2M, a common service entity cannot communicate with an underlying network entity, and achieving an effect that parameter passing and data sending are implemented between the underlying network entity and the common service entity when a communications type of the underlying network entity supports a cellular network.

The data sending apparatus provided in this embodiment further reduces, by adding a configuration identifier to a service configuration file, a data volume that needs to be carried by the service configuration file, so that communication between an underlying network entity and a common service entity is rapider and more effective.

It should be additionally noted that the type acquiring module 720 and the mode receiving module 750 may be implemented by a receiver in the M2M device; the data providing module 760 may be implemented by a transmitter in the M2M device; and the file providing module 740 may be implemented by a processor in the M2M device.

Figure 9:
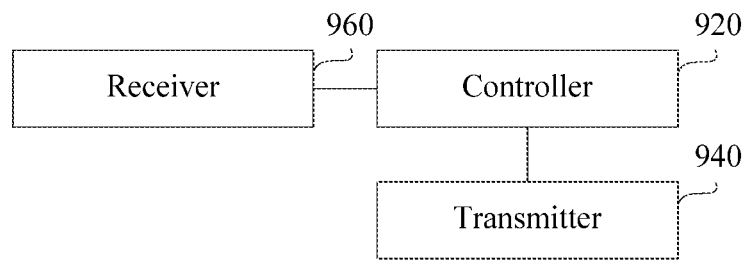
FIG. 9 is a schematic structural diagram of a communications chip according to an embodiment of the present disclosure.

Refer to FIG. 9, which is a structural block diagram of a communications chip according to an embodiment of the present disclosure. The communications chip is used in an M2M device. The communications chip includes a controller 920, a transmitter 940 connected to the controller 920, and a receiver 960 connected to the controller 920, where the controller 920 is configured to provide a common service entity of the M2M device with a communications type supported by the communications chip; the controller 920 is further configured to acquire a service configuration file of the common service entity when the communications type supports a cellular network, where the service configuration file is used to indicate a data sending configuration when the communications type supports the cellular network; the receiver 960 is further configured to receive data that needs to be sent by the common service entity; the controller 920 is further configured to allocate a cellular network communication resource to the data according to the service configuration file; and the transmitter 940 is configured to carry and send the data by using the cellular network communication resource.

To sum up, according to the communications chip of this embodiment, a common service entity in an M2M device acquires a communications type supported by the communications chip from an underlying network entity; and the common service entity provides the communications chip with a service configuration file, where the service configuration file is used to indicate a data sending configuration when the communications type supports a cellular network, receives resource allocation information sent by the underlying network entity, and cooperates with the communications chip in carrying and sending data by using a cellular network communication resource, resolving a problem that in M2M, a common service entity cannot communicate with an underlying network entity, and achieving an effect that parameter passing and data sending are implemented between the underlying network entity and the common service entity when a communications type of the underlying network entity supports a cellular network.

In a first possible implementation manner of the embodiment of FIG. 9, the receiver 960 is configured to receive a communications type request sent by the common service entity; and the transmitter 940 feeds back the communications type to the common service entity after the receiver 960 receives the communications type request; or the transmitter 940 is configured to proactively send the communications type to the common service entity.

With reference to the embodiment of FIG. 9 or the first possible implementation manner of the embodiment of FIG. 9, in a second possible implementation manner, the receiver 940 is configured to receive the service configuration file sent by the common service entity, where the service configuration file is proactively sent after the common service entity detects that the communications type supports the cellular network; or the transmitter 940 is configured to send a configuration file acquiring request to the common service entity; and the receiver 960 is configured to receive the service configuration file fed back by the common service entity, where the service configuration file is fed back after the common service entity receives the configuration file acquiring request and detects that the communications type supports the cellular network; or the receiver 960 is configured to receive the service configuration file proactively sent by the common service entity; and the controller 920 is configured to detect whether the communications type supports the cellular network, and if it is detected that the communications type supports the cellular network, save the service configuration file; or the controller 920 is configured to detect whether the communications type supports the cellular network; if it is detected that the communications type supports the cellular network, the transmitter 940 is configured to send the configuration file acquiring request to the common service entity; and the receiver 960 is configured to receive the service configuration file fed back by the common service entity.

In a third possible implementation manner of the embodiment of FIG. 9, the controller 920 is further configured to, when the data sending configuration indicated by the service configuration file includes a quantity of interactions with a network side and/or a length of a data packet during each interaction, detect whether the quantity of interactions with the network side and/or the length of a data packet during each interaction meet/meets a predetermined transmission mode in the cellular network, where the predetermined transmission mode is a transmission mode optimized for M2M communications in the cellular network; and if it is detected that the predetermined transmission mode is met, the transmitter 940 is further configured to feed back an SAP that is in the predetermined transmission mode to the common service entity.

With reference to the third possible implementation manner of the embodiment of FIG. 9, in a fourth possible implementation manner, the receiver 960 is further configured to, when the SAP that is in the predetermined transmission mode is not fed back to the common service entity, receive the data that is sent by the common service entity by using an SAP that is in a default transmission mode; or the receiver 960 is further configured to, when the SAP that is in the predetermined transmission mode is fed back to the common service entity, receive the data that is sent by the common service entity by using the SAP that is in the predetermined transmission mode.

In a fifth possible implementation manner of the embodiment of FIG. 9, the controller 920 is further configured to, when the data sending configuration indicated by the service configuration file includes a data packet transmission delay, a transmission bit error rate, and/or an identifier indicating an emergency or a non-emergency, convert the data packet transmission delay, the transmission bit error rate, and/or the identifier indicating an emergency or a non-emergency into QOS; and the transmitter 940 is further configured to add, by using an end-to-end connection that meets the QOS and that is established to the cellular network, the data to the allocated cellular network communication resource for sending.

In a sixth possible implementation manner of the embodiment of FIG. 9, the controller 920 is further configured to, when the data sending configuration indicated by the service configuration file includes a specified transmission time, be in a standby state or a power-off state in a time period that does not include the specified transmission time, and in a working state in a time period that includes the specified transmission time.

With reference to the embodiment of FIG. 9 or the first or second or third or fourth or fifth or sixth possible implementation manner, in a seventh possible implementation manner, the service configuration file carries a group of data sending configurations, where the data sending configurations include at least one parameter of a quantity of interactions with a network side, a length of a data packet during each interaction, a data packet transmission delay, a transmission bit error rate, an identifier indicating an emergency or a non-emergency, and a specified transmission time; or the service configuration file carries a configuration identifier, where the configuration identifier is used to correspond to a group of data sending configurations, and the data sending configurations include at least one parameter of: a quantity of interactions with a network side, a length of a data packet during each interaction, a data packet transmission delay, a transmission bit error rate, an identifier indicating an emergency or a non-emergency, and a specified transmission time.

With reference to the seventh possible implementation manner of the embodiment of FIG. 9, in an eighth possible implementation manner, if the service configuration file carries a configuration identifier, the controller 920 is further configured to extract the configuration identifier from the service configuration file; and the controller 920 is further configured to query, by using the configuration identifier, a prestored correspondence for a data sending configuration that corresponds to the configuration identifier, where the correspondence stores correspondences between different configuration identifiers and different data sending configurations.

Figure 10:
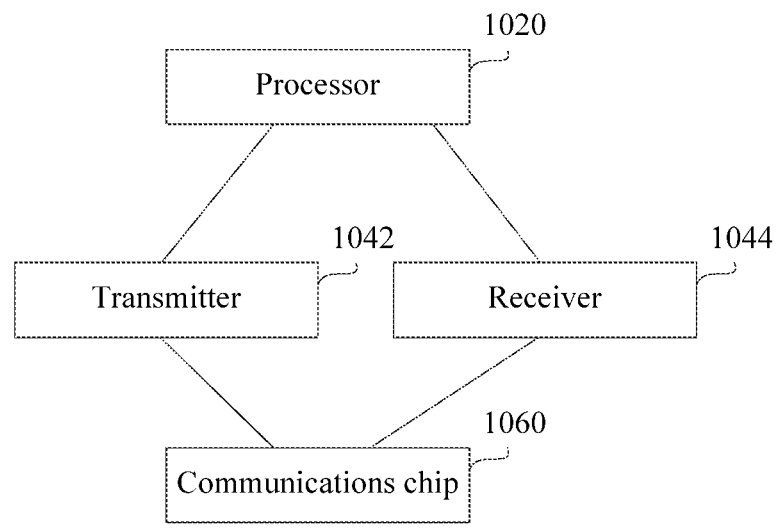
FIG. 10 is a schematic structural diagram of an M2M device according to another embodiment of the present disclosure.

Refer to FIG. 10, which is a structural block diagram of an M2M device according to an embodiment of the present disclosure. The M2M device includes a processor 1020, a transmitter 1042 connected to the processor 1020, a receiver 1044 connected to the processor 1020, and a communications chip 1060 separately connected to the transmitter 1042 and the receiver 1044, where the processor 1020 is configured to acquire, by using the receiver 1044, a communications type supported by the communications chip 1060 from the communications chip of the M2M device; the processor 1020 is further configured to, when the communications type supports a cellular network, provide the communications chip 1060 with a service configuration file by using the transmitter 1042, where the service configuration file is used to indicate a data sending configuration when the communications type includes the cellular network; and the processor 1020 is further configured to provide, by using the transmitter 1042, the communications chip 1060 with data that needs to be sent, so that the communications chip allocates a cellular network communication resource to the data according to the service configuration file, and carries and sends the data by using the cellular network communication resource.

To sum up, according to the M2M device of this embodiment, a processor in the M2M device acquires a communications type supported by a communications chip from the communications chip; and the processor provides the communications chip with a service configuration file when the communications type supports a cellular network, where the service configuration file is used to indicate a data sending configuration when the communications type supports the cellular network, and provides the communications chip with data that needs to be sent, so that the communications chip carries and sends the data by using a cellular network communication resource that is allocated according to the service configuration file, resolving a problem that in an M2M device, a processor cannot communicate with a communications chip, and achieving an effect that parameter passing and data sending are implemented between the communications chip and the processor when a communications type of the communications chip supports a cellular network.

The M2M device provided in this embodiment further reduces, by adding a configuration identifier to a service configuration file, a data volume that needs to be carried by the service configuration file, so that communication between a communications chip and a processor is rapider and more effective.

In a first possible implementation manner of the embodiment of FIG. 10, the transmitter 1042 is configured to send a communications type request to the communications chip 1060 of the M2M device; and the receiver 1044 is configured to receive the communications type that is fed back by the communications chip 1060 after the communications type request is received; or the receiver 1044 is configured to receive the communications type proactively sent by the communications chip 1060.

With reference to the embodiment of FIG. 10 or the first possible implementation manner of the embodiment of FIG. 10, in a second possible implementation manner, the processor 1020 is further configured to detect whether the communications type includes the cellular network; and if it is detected that the communications type includes the cellular network, the transmitter 1042 proactively sends the service configuration file to the communications chip 1060; or the receiver 1044 is further configured to receive a configuration file acquiring request sent by the communications chip 1060; the processor 1020 is further configured to detect whether the communications type includes the cellular network; and if it is detected that the communications type includes the cellular network, the transmitter 1042 feeds back the service configuration file to the communications chip 1060; or the transmitter 1042 is further configured to proactively send the service configuration file to the communications chip 1060, where the service configuration file is saved by the communications chip 1060 after it is detected that the communications type includes the cellular network; or the receiver 1044 is further configured to receive a configuration file acquiring request sent by the communications chip 1060, where the configuration file request is sent by the communications chip after it is detected that the communications type includes the cellular network; and the transmitter 1042 is further configured to feed back the service configuration file to the communications chip 1060.

In a third possible implementation manner of the embodiment of FIG. 10, the receiver 1044 is further configured to receive an SAP that is in a predetermined transmission mode and that is fed back by the communications chip 1060, where the SAP that is in the predetermined transmission mode is fed back by the communications chip 1060 when it is detected, when the data sending configuration includes a quantity of interactions with a network side and/or a length of a data packet during each interaction, that the quantity of interactions with the network side and/or the length of a data packet during each interaction meet/meets a predetermined transmission mode in the cellular network, where the predetermined transmission mode is a transmission mode optimized for M2M communications in the cellular network.

With reference to the third possible implementation manner of the embodiment of FIG. 10, in a fourth possible implementation manner, the transmitter 1042 is further configured to, when the SAP that is in the predetermined transmission mode is not received by the receiver 1044, send the data to the communications chip 1060 by using an SAP that is in a default transmission mode; or the transmitter 1042 is further configured to, when the SAP that is in the predetermined transmission mode is received by the receiver 1044, send the data to the communications chip 1060 by using the SAP that is in the predetermined transmission mode.

With reference to the embodiment of FIG. 10 or the first or second or third or fourth possible implementation manner of the embodiment of FIG. 10, the service configuration file carries a group of data sending configurations, where the data sending configurations include at least one parameter of: a quantity of interactions with a network side, a length of a data packet during each interaction, a data packet transmission delay, a transmission bit error rate, an identifier indicating an emergency or a non-emergency, and a specified transmission time; or the service configuration file carries a configuration identifier, where the configuration identifier is used to correspond to a group of data sending configurations, and the data sending configurations include at least one parameter of: a quantity of interactions with a network side, a length of a data packet during each interaction, a data packet transmission delay, a transmission bit error rate, an identifier indicating an emergency or a non-emergency, and a specified transmission time.

A person of ordinary skill in the art may understand that all or some of the steps of the embodiments may be implemented by hardware or a program instructing related hardware. The program may be stored in a computer readable storage medium. The storage medium may include a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A data sending method, used in an underlying network entity in a machine-to-machine communications (M2M) device, the method comprising:
   providing a common service entity of the M2M device with a communications type supported by the underlying network entity;
   acquiring a service configuration file of the common service entity when the communications type supports a cellular network, the service configuration file indicating a data sending configuration when the communications type supports the cellular network, and the service configuration file comprising a quantity of interactions with a network side, a length of a data packet during an interaction, a data packet transmission delay, and a specified transmission time;
   receiving data from the common service entity;
   allocating a cellular network communication resource to the data according to the service configuration file; and
   carrying and sending the data using the cellular network communication resource.

2. The method of claim 1, wherein providing the common service entity of the M2M device with the communications type supported by the underlying network entity comprises:
   receiving a communications type request from the common service entity, and feeding back the communications type to the common service entity after the communications type request is received; or
   proactively sending the communications type to the common service entity.

3. The method of claim 1, wherein acquiring the service configuration file of the common service entity when the communications type supports the cellular network comprises:
   receiving the service configuration file from the common service entity, the service configuration file being proactively sent after the common service entity detects that the communications type supports the cellular network; or
   sending a configuration file acquiring request to the common service entity, and receiving the service configuration file fed back by the common service entity, the service configuration file being fed back after the common service entity receives the configuration file acquiring request and detects that the communications type supports the cellular network; or
   receiving the service configuration file proactively from the common service entity, detecting whether the communications type supports the cellular network, and saving the service configuration file when detecting that the communications type supports the cellular network; or
   detecting whether the communications type supports the cellular network, sending a configuration file acquiring request to the common service entity when detecting that the communications type supports the cellular network, and receiving the service configuration file fed back by the common service entity.

4. The method of claim 1, wherein after acquiring the service configuration file of the common service entity when the communications type supports the cellular network, the method further comprises:
   detecting whether the quantity of interactions with the network side or the length of the data packet during each interaction meets a predetermined transmission mode in the cellular network when the data sending configuration indicated by the service configuration file comprises the quantity of interactions with the network side or the length of the data packet during each interaction, the predetermined transmission mode being a transmission mode optimized for M2M communications in the cellular network; and feeding back a service access point (SAP) that is in the predetermined transmission mode to the common service entity when detecting that the predetermined transmission mode is met.

5. The method of claim 4, wherein receiving the data from the common service entity comprises:

receiving the data from the common service entity using an SAP that is in a default transmission mode when the SAP that is in the predetermined transmission mode is not fed back to the common service entity; or receiving the data from the common service entity using the SAP that is in the predetermined transmission mode when the SAP that is in the predetermined transmission mode is fed back to the common service entity.

6. The method of claim 1, wherein carrying and sending the data using the cellular network communication resource comprises:

converting the data packet transmission delay, a transmission bit error rate, or an identifier indicating an emergency or a non-emergency into quality of service (QOS) when the data sending configuration indicated by the service configuration file comprises the data packet transmission delay, the transmission bit error rate, or the identifier indicating the emergency or the non-emergency; and adding, using an end-to-end connection that meets the QOS and that is established to the cellular network, the data to the allocated cellular network communication resource for sending.

7. The method of claim 1, wherein the method further comprises being in a standby state or a power-off state in a time period that does not comprise the specified transmission time, and in a working state in a time period that comprises the specified transmission time when the data sending configuration indicated by the service configuration file comprises the specified transmission time.

8. The method of claim 1, wherein the service configuration file carries either a group of data sending configurations or a configuration identifier, the data sending configurations comprising at least one parameter of the quantity of interactions with the network side, the length of the data packet during the interaction, the data packet transmission delay, a transmission bit error rate, an identifier indicating an emergency or a non-emergency, and the specified transmission time, and wherein the configuration identifier corresponds to a group of data sending configurations, the data sending configurations comprising at least one parameter of the quantity of interactions with the network side, the length of the data packet during the interaction, the data packet transmission delay, a transmission bit error rate, an identifier indicating an emergency or a non-emergency, and the specified transmission time.

9. The method of claim 8, wherein when the service configuration file carries the configuration identifier, the method further comprises:

extracting the configuration identifier from the service configuration file; and querying, using the configuration identifier, a prestored correspondence for a data sending configuration that corresponds to the configuration identifier, the prestored correspondence storing correspondences between different configuration identifiers and different data sending configurations.

10. A data sending method, used in a common service entity in a machine-to-machine communications (M2M) device, the method comprising:

acquiring a communications type supported by an underlying network entity from the underlying network entity of the M2M device;

providing the underlying network entity with a service configuration file when the communications type supports a cellular network, the service configuration file indicating a data sending configuration when the communications type supports the cellular network, and the service configuration file comprising a quantity of interactions with a network side, a length of a data packet during an interaction, a data packet transmission delay, and a specified transmission time; and providing the underlying network entity with data, the underlying network entity allocating a cellular network communication resource to the data according to the service configuration file, and the underlying network entity carrying and sending the data using the cellular network communication resource.

11. The method of claim 10, wherein acquiring the communications type supported by the underlying network entity from the underlying network entity of the M2M device comprises:

sending a communications type request to the underlying network entity of the M2M device, and receiving the communications type that is fed back by the underlying network entity after the communications type request is received; or receiving the communications type proactively from the underlying network entity.

12. The method of claim 10, wherein providing the underlying network entity with the service configuration file when the communications type supports the cellular network comprises:

detecting whether the communications type supports the cellular network, and proactively sending the service configuration file to the underlying network entity when detecting that the communications type supports the cellular network; or receiving a configuration file acquiring request from the underlying network entity, detecting whether the communications type supports the cellular network, and feeding back the service configuration file to the underlying network entity when detecting that the communications type supports the cellular network; or proactively sending the service configuration file to the underlying network entity, the service configuration file being saved by the underlying network entity after the underlying network entity detects that the communications type supports the cellular network; or receiving a configuration file acquiring request from the underlying network entity, the configuration file acquiring request being sent after the underlying network entity detects that the communications type supports the cellular network, and feeding back the service configuration file to the underlying network entity.

13. The method of claim 10, wherein after providing the underlying network entity with the service configuration file when the communications type supports the cellular network, the method further comprises receiving a service access point (SAP) that is in a predetermined transmission mode and that is fed back by the underlying network entity, the SAP that is in the predetermined transmission mode being fed back by the underlying network entity when it is detected, when the data sending configuration indicated by the service configuration file comprises the quantity of interactions with the network side or the length of the data packet during each interaction, that the quantity of interactions with the network side or the length of the data packet during each interaction meets the predetermined transmission mode in the cellular network, and the predetermined transmission mode being a transmission mode optimized for M2M communications in the cellular network.

14. The method of claim 13, wherein providing the underlying network entity with the data comprises:
sending the data to the underlying network entity using an SAP that is in a default transmission mode when the SAP that is in the predetermined transmission mode is not received; or
sending the data to the underlying network entity using the SAP that is in the predetermined transmission mode when the SAP that is in the predetermined transmission mode is received.

15. The method of claim 10, wherein the service configuration file either carries a group of data sending configurations or a configuration identifier, the data sending configurations comprising at least one parameter of the quantity of interactions with the network side, the length of the data packet during the interaction, the data packet transmission delay, a transmission bit error rate, an identifier indicating an emergency or a non-emergency, and the specified transmission time, and wherein the configuration identifier corresponds to a group of data sending configurations, the data sending configurations comprising at least one parameter of the quantity of interactions with the network side, the length of the data packet during the interaction, the data packet transmission delay, a transmission bit error rate, an identifier indicating an emergency or a non-emergency, and the specified transmission time.

16. An underlying network entity, used in a machine-to-machine communications (M2M) device, the entity comprising:
a non-transitory computer readable medium having instructions stored thereon; and
a computer processor coupled to the non-transitory computer readable medium and configured to execute the instructions to:
provide a common service entity of the M2M device with a communications type supported by the underlying network entity;
acquire a service configuration file of the common service entity when the communications type supports a cellular network, the service configuration file indicating a data sending configuration when the communications type supports the cellular network, and the service configuration file comprising a quantity of interactions with a network side, a length of a data packet during an interaction, a data packet transmission delay, and a specified transmission time;
receive data from the common service entity;
allocate a cellular network communication resource to the data according to the service configuration file; and
carry and send the data using the cellular network communication resource.

17. The entity of claim 16, wherein the computer processor is configured to execute the instructions to:
receive a communications type request from the common service entity, and feed back the communications type to the common service entity after the communications type request is received; or
proactively send the communications type to the common service entity.

18. The entity of claim 16, wherein the computer processor is configured to execute the instructions to:
receive the service configuration file from the common service entity, the service configuration file being proactively sent after the common service entity detects that the communications type supports the cellular network; or
send a configuration file acquiring request to the common service entity, and receive the service configuration file fed back by the common service entity, the service configuration file being fed back after the common service entity receives the configuration file acquiring request and detects that the communications type supports the cellular network; or
receive the service configuration file proactively from the common service entity, detect whether the communications type supports the cellular network, and save the service configuration file when detecting that the communications type supports the cellular network; or
detect whether the communications type supports the cellular network, send a configuration file acquiring request to the common service entity when detecting that the communications type supports the cellular network, and receive the service configuration file fed back by the common service entity.

19. The entity of claim 16, wherein the computer processor is configured to execute the instructions to:
detect whether the quantity of interactions with the network side or the length of the data packet during the interaction meets a predetermined transmission mode in the cellular network when the data sending configuration indicated by the service configuration file comprises the quantity of interactions with the network side or the length of the data packet during each interaction, the predetermined transmission mode being a transmission mode optimized for M2M communications in the cellular network; and
feed back a service access point (SAP) that is in the predetermined transmission mode to the common service entity when detecting that the predetermined transmission mode is met.

20. The entity of claim 19, wherein the computer processor is configured to execute the instructions to:
receive the data from the common service entity using an SAP that is in a default transmission mode when the SAP that is in the predetermined transmission mode is not fed back by a service feedback module to the common service entity; or
receive the data from the common service entity using the SAP that is in the predetermined transmission mode when the SAP that is in the predetermined transmission mode is fed back by the service feedback module to the common service entity.

21. The entity of claim 16, wherein the computer processor is configured to execute the instructions to:
convert the data packet transmission delay, a transmission bit error rate, or an identifier indicating an emergency or a non-emergency into quality of service (QOS) when the data sending configuration indicated by the service configuration file comprises the data packet transmission delay, the transmission bit error rate, or the identifier indicating the emergency or the non-emergency; and add, using an end-to-end connection that meets the QOS and that is established to the cellular network, the data to the allocated cellular network communication resource for sending.

22. The entity of claim 16, wherein the computer processor is configured to execute the instructions to be in a standby state or a power-off state in a time period that does not comprise the specified transmission time, and in a working state in a time period that comprises the specified transmission time when the data sending configuration indicated by the service configuration file comprises the specified transmission time.

23. The entity of claim 16, wherein the service configuration file either carries a group of data sending configurations or a configuration identifier, the data sending configurations comprising at least one parameter of the quantity of interactions with the network side, the length of the data packet during the interaction, the data packet transmission delay, a transmission bit error rate, an identifier indicating an emergency or a non-emergency, and the specified transmission time, and wherein the configuration identifier corresponds to a group of data sending configurations, the data sending configurations comprising at least one parameter of the quantity of interactions with the network side, the length of the data packet during the interaction, the data packet transmission delay, a transmission bit error rate, an identifier indicating an emergency or a non-emergency, and the specified transmission time.

24. The entity of claim 23, wherein when the service configuration file carries a configuration identifier, the computer processor is configured to execute the instructions to:
    extract the configuration identifier from the service configuration file; and
    query, using the configuration identifier, a prestored correspondence for a data sending configuration that corresponds to the configuration identifier, the prestored correspondence storing correspondences between different configuration identifiers and different data sending configurations.

25. A common service entity, used in a machine-to-machine communications (M2M) device, the entity comprising:
    a non-transitory computer readable medium having instructions stored thereon; and
    a computer processor coupled to the non-transitory computer readable medium and configured to execute the instructions to:
        acquire a communications type supported by an underlying network entity from the underlying network entity of the M2M device;
        provide the underlying network entity with a service configuration file when the communications type supports a cellular network, the service configuration file indicating a data sending configuration when the communications type comprises the cellular network, and the service configuration file comprising a quantity of interactions with a network side, a length of a data packet during an interaction, a data packet transmission delay, and a specified transmission time; and
        provide the underlying network entity with data, the underlying network entity allocating a cellular network communication resource to the data according to the service configuration file, and the underlying network entity carrying and sending the data using the cellular network communication resource.

26. The entity of claim 25, wherein the computer processor is configured to execute the instructions to:
    send a communications type request to the underlying network entity of the M2M device; and
    either receive the communications type that is fed back by the underlying network entity after the communications type request is received; or
    receive the communications type proactively from the underlying network entity.

27. The entity of claim 25, wherein the computer processor is configured to execute the instructions to:
    detect whether the communications type supports the cellular network, and proactively send the service configuration file to the underlying network entity when detecting that the communications type supports the cellular network; or
    receive a configuration file acquiring request from the underlying network entity, detect whether the communications type supports the cellular network, and feed back the service configuration file to the underlying network entity when detecting that the communications type supports the cellular network; or
    proactively send the service configuration file to the underlying network entity, the service configuration file being saved by the underlying network entity after the underlying network entity detects that the communications type supports the cellular network; or
    receive a configuration file acquiring request from the underlying network entity, the configuration file request being sent after the underlying network entity detects that the communications type supports the cellular network, and feed back the service configuration file to the underlying network entity.

28. The entity of claim 25, wherein the computer processor is configured to execute the instructions to receive a service access point (SAP) that is in a predetermined transmission mode and that is fed back by the underlying network entity, the SAP that is in the predetermined transmission mode being fed back by the underlying network entity when it is detected, when the data sending configuration indicated by the service configuration file comprises the quantity of interactions with the network side or the length of the data packet during the interaction, that the quantity of interactions with the network side or the length of the data packet during each interaction meets the predetermined transmission mode in the cellular network, and the predetermined transmission mode is a transmission mode optimized for M2M communications in the cellular network.

29. The entity of claim 28, wherein the computer processor is configured to execute the instructions to:
    send the data to the underlying network entity using an SAP that is in a default transmission mode when the SAP that is in the predetermined transmission mode is not received by the mode receiving module; or
    send the data to the underlying network entity using the SAP that is in the predetermined transmission mode when the SAP that is in the predetermined transmission mode is received by the mode receiving module.

30. The entity of claim 25, wherein the service configuration file either carries a group of data sending configurations or a configuration identifier, the data sending configurations comprising at least one parameter of the quantity of interactions with the network side, the length of the data packet during the interaction, the data packet transmission delay, a transmission bit error rate, an identifier indicating an emergency or a non-emergency, and the specified transmission time, and wherein the configuration identifier corresponds to a group of data sending configurations, the data sending configurations comprising at least one parameter of the quantity of interactions with the network side, the length of the data packet during the interaction, the data packet transmission delay, a transmission bit error rate, an identifier indicating an emergency or a non-emergency, and the specified transmission time.

\* \* \* \* \*